US012246249B2

(12) United States Patent
Aoki et al.

(10) Patent No.: US 12,246,249 B2
(45) Date of Patent: Mar. 11, 2025

(54) INFORMATION PROCESSING DEVICE, DATA SYNCHRONIZATION PROGRAM, DATA SYNCHRONIZATION METHOD, DATA SYNCHRONIZATION SYSTEM, AND TERMINAL DEVICE

(71) Applicant: SOFTGEAR CO., LTD., Tokyo (JP)

(72) Inventors: Kengo Aoki, Tokyo (JP); Naoki Miyanaga, Tokyo (JP)

(73) Assignee: SOFTGEAR CO., LTD., Tokyo (JP)

( * ) Notice: Subject to any disclaimer, the term of this patent is extended or adjusted under 35 U.S.C. 154(b) by 0 days.

(21) Appl. No.: 18/633,516

(22) Filed: Apr. 12, 2024

(65) Prior Publication Data

US 2024/0252915 A1 Aug. 1, 2024

Related U.S. Application Data

(63) Continuation of application No. 18/450,427, filed on Aug. 16, 2023, now Pat. No. 11,992,753, which is a (Continued)

(30) Foreign Application Priority Data

Jun. 14, 2021 (JP) ................................ 2021-098419

(51) Int. Cl.
*A63F 13/31* (2014.01)
*G06T 17/00* (2006.01)

(52) U.S. Cl.
CPC .............. *A63F 13/31* (2014.09); *G06T 17/00* (2013.01); *A63F 2300/5533* (2013.01)

(58) Field of Classification Search
CPC .......... A63F 13/31; A63F 13/35; A63F 13/60; A63F 2300/55; A63F 2300/5533
See application file for complete search history.

(56) References Cited

U.S. PATENT DOCUMENTS 6,763,371 B1 7/2004 Jandel
9,386,051 B2 7/2016 Hoshino et al.
(Continued)

FOREIGN PATENT DOCUMENTS

CN 1350677 A 5/2002
CN 101010125 A 8/2007
(Continued)

OTHER PUBLICATIONS

Office Action in CN Application No. 202280008097.3, dated Mar. 7, 2024. 13pp.
(Continued)

*Primary Examiner* — James S. McClellan
(74) *Attorney, Agent, or Firm* — HAUPTMAN HAM, LLP

(57) ABSTRACT

An information processing device is connected through a network to a plurality of clients configured to participate in virtual spaces, and is capable of synchronizing a synchronization target object in the virtual spaces among clients of the plurality of clients in a synchronization group. The synchronization target object includes terrain information for reproducing contents constituting the virtual spaces. The information processing device includes a non-transitory computer-readable medium containing executable instructions to receive change content information of the synchronization target object in the virtual spaces from a client in the synchronization group, update a replicated synchronization target object obtained by replicating the synchronization target object by using the change content information, transmit the change content information to the clients in a synchronization group in the synchronization group, and edit the terrain information on a basis of operation content from any of the clients having an edit right of the terrain information.

18 Claims, 16 Drawing Sheets

Related U.S. Application Data continuation of application No. PCT/JP2022/023718, filed on Jun. 14, 2022.

(56) References Cited

U.S. PATENT DOCUMENTS

| | | | |
|---|---|---|---|
| 11,055,885 B1* | 7/2021 | Schwaiger | G06T 11/206 |
| 2007/0207860 A1 | 9/2007 | Yamauchi et al. | |
| 2008/0282090 A1 | 11/2008 | Leybovich | |
| 2009/0100355 A1 | 4/2009 | Takeuchi et al. | |
| 2011/0250957 A1 | 10/2011 | Suzuki et al. | |
| 2012/0150921 A1 | 6/2012 | Yamakawa | |
| 2013/0031653 A1 | 1/2013 | Lussenden | |
| 2014/0082077 A1 | 3/2014 | Hoshino et al. | |
| 2017/0197149 A1* | 7/2017 | Gutmann | G07F 17/32 |
| 2017/0244857 A1* | 8/2017 | Yoshida | H04N 1/00973 |
| 2018/0018178 A1 | 1/2018 | Ma et al. | |
| 2020/0269131 A1 | 8/2020 | Pereira | |

FOREIGN PATENT DOCUMENTS

| | | |
|---|---|---|
| CN | 102576425 A | 7/2012 |
| CN | 106797402 A | 5/2017 |
| CN | 110694266 A | 1/2020 |
| CN | 112642143 A | 4/2021 |
| EP | 2352096 B1 | 1/2019 |
| JP | 2000157724 A | 6/2000 |
| JP | 2007125250 A | 5/2007 |
| JP | 2007185446 A | 7/2007 |
| JP | 2008022573 A | 1/2008 |
| JP | 2014056546 A | 3/2014 |
| JP | 2019017874 A | 2/2019 |
| KR | 1020050023495 A | 3/2005 |
| KR | 1020180009352 A | 1/2018 |
| WO | 0068864 A1 | 11/2000 |
| WO | 2004034729 A1 | 4/2004 |

OTHER PUBLICATIONS

Extended European Search Report in EP Application No. 22824978.5, dated Jan. 3, 2024. 13pp.
Office Action in JP Application No. 2023-069164, mailed Dec. 19, 2023. 13pp.
Office Action in CN Application No. 202280008097.3, dated Dec. 15, 2023. 10pp.
Office Action in CN Application No. 202280004615.4, dated Dec. 28, 2023. 10pp.
Written Opinion in PCT/JP2022/023717, mailed Aug. 9, 2022. 13pp.
Written Opinion in PCT/JP2022/023718, mailed Aug. 9, 2022. 13pp.
Office Action in JP Application No. 2021-098419, mailed Aug. 10, 2021. 13pp.
Office Action in JP Application No. 2022-555956, mailed Dec. 13, 2022. 6pp.
Written Opinion in JP Application No. 2022-555956, filed Jan. 5, 2023. 4pp.
Decision to Grant in JP Application No. 2022-555956, mailed Mar. 22, 2023. 6pp.
Office Action in KR Application No. 10-2022-7043276, mailed May 12, 2023. 14pp.
Office Action in KR Application No. 10-2023-7016620, mailed Jun. 2, 2023. 8pp.
Office Action in CN Application No. 202280004615.4, dated Aug. 25, 2023. 16pp.
Office Action in EP Application No. 22824978.5, dated Sep. 12, 2024. 8pp.

* cited by examiner

| AREA ID | TERRAIN DATA | URL | CREATION DATE AND TIME | UPDATE DATE AND TIME | CREATOR | OWNER | NEW ROOM CREATION RULE |
|---|---|---|---|---|---|---|---|
| A001 | xxxx | http://sample.area1 | 2022/7/10 05:11:34 | 2022/7/10 05:11:34 | U001 | U001 | TRANSFER 2,000 PARTICIPANTS |
| A002 | yyyy | http://sample.area2 | 2022/6/29 12:11:11 | 2022/6/29 12:11:11 | U002 | U002 | RESPOND TO PARTICIPANT'S REQUEST |
| ... | ... | ... | ... | ... | ... | ... | ... |

| ROOM ID | AREA ID | URL | GENERATION DATE AND TIME |
|---|---|---|---|
| R001 | A005 | http://sample.room5 | 2022/1/5 0:05:10 |
| R002 | A010 | http://sample.room10 | 2022/2/3 13:23:07 |
| ⋮ | ⋮ | ⋮ | ⋮ |

FIG. 7

| AREA ID | A001 | | | |
|---|---|---|---|---|
| ACTIVE ROOM ID | R001,R101,R201 | | | |
| PARTICIPANT LIST | U001,U002,U003,U005,U008,U101,U102,U202,U204 | | | |
| REPLICA ID | OWNER | TRANSMISSION DESTINATION RULE | TRANSFER | REPLICA |
| G1 | U001 | USER OTHER THAN OWNER (ALL ROOM PARTICIPANTS) | PERMITTED | REPLICA G1 |
| G2 | U001 | USER OTHER THAN OWNER (ALL ROOM PARTICIPANTS) | PERMITTED | REPLICA G2 |
| B1 | U001 | USER OTHER THAN OWNER (ALL ROOM PARTICIPANTS) | PERMITTED | REPLICA B1 |
| M1 | U001 | USER OTHER THAN OWNER (ALL ROOM PARTICIPANTS) | NOT PERMITTED | REPLICA M1 |
| ... | ... | ... | ... | ... |

| REPLICA ID | OWNER | TRANSMISSION DESTINATION RULE | TRANSFER | REPLICA |
|---|---|---|---|---|
| | ROOM ID | R001 | | |
| | PARTICIPANT LIST | U001,U002,U003,U005,U008 | | |
| A | U001 | USER OTHER THAN OWNER | PERMITTED | REPLICA A |
| L | U001 | USER IN GROUP α OTHER THAN OWNER | NOT PERMITTED | REPLICA L |
| B | U002 | USER WITHIN DISTANCE OF 50 OTHER THAN OWNER | PERMITTED | REPLICA B |
| ... | ... | ... | ... | ... |

114B

INFORMATION PROCESSING DEVICE, DATA SYNCHRONIZATION PROGRAM, DATA SYNCHRONIZATION METHOD, DATA SYNCHRONIZATION SYSTEM, AND TERMINAL DEVICE

CROSS-REFERENCE TO RELATED APPLICATIONS

The present application is a continuation application of U.S. Application Ser. No. 18/450,427, filed on Aug. 16, 2023, based on and claims the benefit of priority from the prior Japanese patent application No. 2021-098419 filed on Jun. 14, 2021, and PCT Application No. PCT/JP2022/023718 filed Jun. 14, 2022, the entire contents of which are incorporated herein by reference.

TECHNICAL FIELD

The embodiments relate to an information processing device, a data synchronization program, a data synchronization method, a data synchronization system, and a terminal device.

BACKGROUND ART

As a conventional technology, an information processing device that synchronizes a user object of a user terminal with a simulation target of a simulator has been proposed (see, for example, Patent Literature 1).

The information processing device disclosed in Patent Literature 1 is connected to an individual simulator that simulates a behavior of a predetermined simulation target and a user terminal that determines a behavior of a user object according to an instruction input from a user, the information processing device holds the user object and a copy of the simulation target, and the user terminal acquires simulation target information from the individual simulator via the information processing device for each synchronization timing determined based on a predetermined timing determination rule, predicts the behavior of the simulation target based on the latest acquired simulation target information at a time point other than the synchronization timing, and presents a result of the prediction to the user. With such a configuration, a processing load and a communication load are reduced.

CITATION LIST

Patent Literature

Patent Literature 1: JP 2007-185446 A

SUMMARY OF INVENTION

Technical Problem

However, the information processing device of Patent Literature 1 holds the user object and the copy of the simulation target, and transmits the copy of the simulation target included in a visual field range of the user object to the user terminal. Therefore, although the processing load and the communication load are reduced, the information processing device performs collision determination for the simulation target, and makes a notification to the corresponding simulator to cause the simulator to perform interaction, so that a processing load for the determination is applied to the information processing device. In addition, the user object and a copy of another simulation target are not transmitted to the simulator. Thus, there is the problem that the information processing device cannot be directly applied to a situation where data of a plurality of user terminals are synchronized in a configuration in which the plurality of user terminals participate. This problem becomes apparent particularly in a metaverse or a massively multiplayer online game (MMOG) in which a very large number of user terminals participate, and further, any intermediate participation or intermediate exit is allowed and the user terminals are frequently changed.

Therefore, an object of the embodiments is to provide an information processing device, a data synchronization program, a data synchronization method, a data synchronization system, and a terminal device that suppress an increase in processing load and communication load in a situation in which a plurality of user terminals participate and data of the plurality of user terminals are synchronized.

Solution to Problem

In order to achieve the above-described object, one aspect of the embodiments provides the following information processing device, data synchronization program, data synchronization method, data synchronization system, and terminal device.

Aspects of a first embodiment include an information processing device that is connected through a network to a plurality of clients configured to participate in one or more virtual spaces, a synchronization target object in the virtual space being synchronized between clients in a synchronization group including a client that has ownership of the synchronization target object and a client that does not have the ownership, the information processing device including: reception means configured to receive change content information of a synchronization target object from each client that has ownership of the synchronization target object among the clients in the synchronization group; update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and transmission means configured to transmit the change content information to a client other than the client that has the ownership among the clients in the synchronization group.

Aspects of a second embodiment include the information processing device according to the first embodiment, in which the client belongs to one or more of the synchronization groups.

Aspects of a third embodiment include the information processing device according to the first embodiment, in which the synchronization group includes clients configured to synchronize user information among the synchronization target objects with each other.

Aspects of a fourth embodiment include the information processing device according to the first embodiment, in which the synchronization group includes clients configured to synchronize terrain information for reproducing content constituting a virtual space among the synchronization target objects.

Aspects of a fifth embodiment include the information processing device according to the fourth embodiment, in which a client that has ownership of a synchronization target object corresponding to the terrain information among the synchronization target objects is a dummy client on a server.

Aspects of a sixth embodiment include the information processing device according to the fourth embodiment, further functioning as an editing means configured to edit the terrain information on the basis of operation content from a client that has an edit right of the terrain information.

Aspects of a seventh embodiment include the information processing device according to the sixth embodiment, further functioning as terrain information management means configured to issue an identifier corresponding to an object including the synchronization target object in the virtual space.

Aspects of an eighth embodiment include the information processing device according to the seventh embodiment, in which the identifier is used by the client to access content of the virtual space.

Aspects of a ninth embodiment include the information processing device according to the eighth embodiment, in which the access to the content of the virtual space is participation of the client in the virtual space.

Aspects of a tenth embodiment include the information processing device according to the eighth embodiment, in which the access to the content of the virtual space is editing of the content of the client.

Aspects of an eleventh embodiment include the information processing device according to the ninth embodiment, in which the access to the content of the virtual space is startup of a program in the client for participating in the virtual space.

Aspects of a twelfth embodiment include the information processing device according to the tenth embodiment, in which the access to the content of the virtual space is access to a web site for editing the content by the client, and is startup of a web browser for accessing the web site.

Aspects of a thirteenth embodiment include the information processing device according to the first embodiment, in which when a client participates in a synchronization group in which the plurality of clients participate, the reception means receives the synchronization target object owned by the client and stores the synchronization target object as the replicated object in a recording medium.

Aspects of a fourteenth embodiment include the information processing device according to the first embodiment, in which in a case where a client has an editing right of the area information when the client participates in a synchronization group in which the plurality of clients participate, the transmission means transmits the replicated object to the client as a synchronization target object of the client and further transfers ownership.

Aspects of a fifteenth embodiment include the information processing device according to the first embodiment, in which when the client generates a new object, the reception means replicates the newly generated object as the synchronization target object and stores the replicated object in a recording medium.

Aspects of a sixteenth embodiment include the information processing device according to any of the thirteenth embodiment to the fifteenth embodiment, in which when the client participates or when the client newly generates an object, the transmission means transmits the replicated object or the synchronization target object stored in a recording medium to a client other than the client that has the ownership among the plurality of clients.

Aspects of a seventeenth embodiment include the information processing device according to any of the thirteenth embodiment to the fifteenth embodiment, in which the reception means does not receive the change content information of the synchronization target object from a client other than the client that has the ownership of the synchronization target object.

Aspects of an eighteenth embodiment include the information processing device according to any of the thirteenth embodiment to the fifteenth embodiment, in which in a case where the reception means receives the change content information of the synchronization target object from a client other than the client that has the ownership of the synchronization target object, the update means does not update the replicated object.

Aspects of a nineteenth embodiment include the information processing device according to any of the thirteenth embodiment to the fifteenth embodiment, in which in a case where the reception means receives the change content information of the synchronization target object from a client other than the client that has the ownership of the synchronization target object, the transmission means does not transmit the change content information to the client that has the ownership.

Aspects of a twentieth embodiment include the information processing device according to any of the thirteenth embodiment to the fifteenth embodiment, in which the reception means receives a difference from the synchronization target object before change as the change content information of the synchronization target object, and the update means updates the replicated object.

Aspects of a twenty-first embodiment include the information processing device according to any of the thirteenth embodiment to the fifteenth embodiment, further functioning as management means configured to transfer ownership of the replicated object corresponding to the synchronization target object owned by the client to a different client other than the client based on a predetermined rule in a case where the transfer of the ownership is permitted when the client exits from the synchronization group in which the plurality of clients participate.

Aspects of a twenty-second embodiment include the information processing device according to any of the thirteenth embodiment to the fifteenth embodiment, further functioning as management means configured to delete the replicated object in a case where transfer of ownership of the replicated object corresponding to the synchronization target object owned by the client is not permitted when the client exits from the synchronization group in which the client participates, in which the transmission means instructs a different client other than the client to delete an object corresponding to the replicated object held by the different client.

Aspects of a twenty-third embodiment include a data synchronization program for a computer connected through a network to a plurality of clients configured to participate in a virtual space, a synchronization target object in the virtual space being synchronized between clients in a synchronization group including a client that has ownership of the object and a client that does not have the ownership, the data synchronization program being configured to cause the computer to function as: reception means configured to receive change content information of a synchronization target object from each client that has ownership of the synchronization target object; update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and transmission means configured to transmit the change content information to a client other than the client that has the ownership among the clients in the synchronization group.

Aspects of a twenty-fourth embodiment include a data synchronization system including: a plurality of clients configured to participate in a virtual space; and an information processing device connected through a network to the plurality of clients, a synchronization target object in the virtual space being synchronized between clients in a synchronization group including a client that has ownership of the object and a client that does not have the ownership, the information processing device including: reception means configured to receive change content information of a synchronization target object from each client that has ownership of the synchronization target object; update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and transmission means configured to transmit the change content information to a client other than the client that has the ownership among the clients in the synchronization group.

Aspects of a twenty-fifth embodiment include the data synchronization system according to the twenty-fourth embodiment, in which the plurality of clients transmit, to the information processing device, a difference from the synchronization target object before change as the change content information of the synchronization target object.

Aspects of a twenty-sixth embodiment include a terminal device serving as a client configured to participate in a virtual space and connected through a network to another client via an information processing device, a synchronization target object in the virtual space being synchronized between clients in a synchronization group including a client that has ownership of the object and a client that does not have the ownership, the terminal device including: reception means configured to receive via the information processing device, by referring to management information that is managed for each synchronization target object and defines a client that has ownership of the synchronization target object, change content information of the synchronization target object from a client that has ownership of the synchronization target object only in a case where a transmission source client is defined as the client that has the ownership of the synchronization target object in the management information; update means configured to update a replicated object obtained by replicating the synchronization target object by using the change content information; and transmission means configured to transmit the change content information to a client other than the client that has the ownership among the clients in the synchronization group, in which the terminal device is communicably connected to the information processing device.

Aspects of a twenty-seventh embodiment include a terminal device serving as a client configured to participate in a virtual space and connected through a network to another client via an information processing device, a synchronization target object in the virtual space being synchronized between clients in a synchronization group including a client that has ownership of the object and a client that does not have the ownership, the terminal device including transmission means configured to transmit, by referring to management information that is managed for each synchronization target object and defines a client that has ownership of the synchronization target object, the change content information to the information processing device only in a case where the own client is defined as the client that has the ownership of the synchronization target object in the management information, when a replicated object obtained by replicating a synchronization target object is updated in the own client, in which the terminal device is communicably connected to the information processing device.

Aspects of a twenty-eighth embodiment include the terminal device serving as a client according to the twenty-sixth embodiment or the twenty-seventh embodiment, in which a difference from the synchronization target object before change is transmitted to the information processing device as the change content information of the synchronization target object.

Aspects of a twenty-ninth embodiment include the terminal device according to the twenty-sixth embodiment or the twenty-seventh embodiment, in which an identifier issued by the information processing device is used to access the virtual space and access an editing web site of terrain information for reproducing content constituting the virtual space.

Aspects of a thirtieth embodiment include a virtual space management provider that is connected through a network to a plurality of clients configured to participate in one or more virtual spaces, a synchronization target object in the virtual space being synchronized between clients in a synchronization group including a client that has ownership of the synchronization target object and a client that does not have the ownership, the virtual space management provider including: reception means configured to receive change content information of a synchronization target object from each client that has ownership of the synchronization target object among the clients in the synchronization group; update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and transmission means configured to transmit the change content information to a client other than the client that has the ownership among the clients in the synchronization group.

Advantageous Effects of Invention

According to the embodiments, it is possible to suppress an increase in processing load and communication load in a situation in which a plurality of user terminals participate and data of the plurality of user terminals are synchronized.

BRIEF DESCRIPTION OF DRAWINGS

FIG. 5 is a diagram illustrating a configuration of room management information.

FIG. 7 is a diagram illustrating a configuration of replica management information of a certain area.

FIG. 8 is a diagram illustrating a configuration of replica management information of a certain room.

EMBODIMENT

Figure 1:
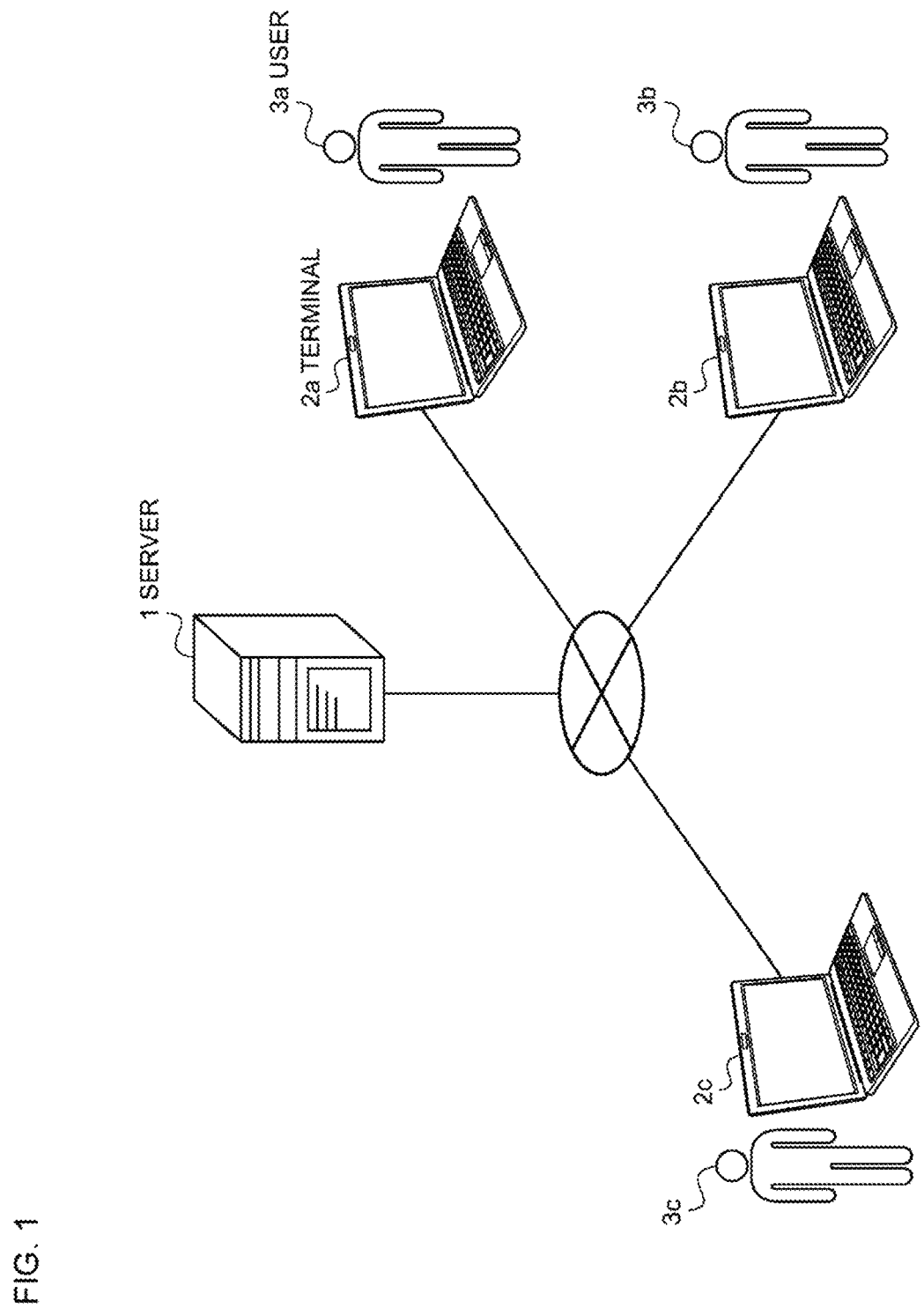
FIG. 1 is a schematic diagram illustrating an example of a configuration of a synchronization system according to an embodiment.

In a synchronization system according to the present embodiment, a plurality of participants do an activity in a common virtual space, for example, a metaverse or a massively multiplayer online game (MMOG). In the virtual space, a ground, a building, a room, and objects associated therewith (furniture, watch, door, etc.), a service provided in the ground, the building, and the room, a program executed in the service, and the like are prepared, and these are managed as terrain information to be described later. These pieces of terrain information of the virtual space correspond to content information of experience (hereinafter also referred to as "game experience") that can be demonstrated in the virtual space. In the present embodiment, these pieces of terrain information are also centrally managed by a server, and can be acquired from the server at the time of participation in the virtual space. It is possible to experience more content in a more recent state than in a case where the content is downloaded or distributed to the participant terminal in advance. Furthermore, since the latest content information is managed by the server, the participant can contribute to the development and correction of the content.

In the metaverse or MMOG, activities of participants are associated with each other as time passes in the virtual space. A plurality of virtual characters operated by the plurality of participants interact with each other, fight with each other, fight together, work together, collect items, or the like as time passes. Then, by such an activity, the character earns or loses owned items, a numerical value related to a battle, and an experience point related to an action. Through the interaction between characters, the participants share experiences in the virtual space, and feel a sense of immersion and a sense of unity. In addition, the ground, the building, the room, and the objects accompanying them included in the terrain information are also changed by the operation of the character (for example, deformation of the ground, extension and demolition of a building, movement of furniture, operation of a clock, opening and closing of a door, and the like).

In such a virtual space, in a client terminal, a state of a change of the activity over time due to the virtual character, item, or terrain information is synchronized and displayed, and the participants can experience the same virtual space. In other words, it is necessary to synchronize an object and terrain information existing in the metaverse or game such as the virtual character and item, between the clients.

In particular, in the metaverse, a room (world, area) that can be freely created, modified, and customized by a participant, such as a participant's home world and a world created by participant, can be defined in many cases. It may be a room of an individual who expresses his/her favorite hobby (anime, space travel, cat, mini-game, dungeon, etc.), or a room of a company for the purpose of Internet sales, a showroom, or an exhibition. Note that the room, the world, and the area are often synonymous with the virtual space, but in the present embodiment, the area and the room correspond to a certain area in which experience can be shared in all or a part of the virtual space. Hereinafter, the virtual space my mean the whole (an aggregate of certain regions divided as a place for shared experience, or the entire region of the virtual space provided by a virtual space application or a virtual space service using the present embodiment) of the virtual space provided with the present embodiment, and may also mean a part of the virtual space which is a certain region divided as a place for shared experience. When it is particularly necessary to distinguish, the former may be referred to as one or more virtual spaces or the like, and the latter may be referred to as an area or a room as described later. Due to various restrictions and circumstances, there may be a plurality of virtual spaces (corresponding to rooms) in which the same content (corresponding to areas) can be experienced, and even if the users intend to enter the same virtual space at the same time, the users may be unable to meet each other in the virtual space (room) by being distributed to different virtual spaces (rooms, in which participants are brought into a parallel world state) although the content in the same area can be experienced. In the present embodiment, a space in which a content itself of the virtual space uniquely exists may be called area, a space in which zero or more virtual spaces that the participant participating in the area actually experience exist may be called room, and these terms may be used properly. If there is only a single virtual experience space (room) in a single virtual space (area) in which a participant can participate, the area and the room are approximately synonymous.

That is, in a metaverse or an online game as MMOG as described above and another network application such as a conference system, a technology of synchronizing content information such as a document and a moving image between terminals of participants is used. Here, the number of participants and the content of the synchronization target (synchronization target object: hereinafter, all objects to be synchronized, including virtual characters, items, terrain information, and the like is referred to as "synchronization target objects") increases, the amount of data required for synchronization increases, synchronization delay (lag or latency) increases, and thus the use as the network application is no longer possible.

In other words, the synchronization target objects as described above are classified into two types of area information and non-area information. The area information is the above-described terrain information and is attribute information of an area necessary for reproducing content (area) constituting the virtual space regardless of the terrain, including synchronization target information. For example, the area information may be a ground, a building, a room, and objects accompanying the ground, the building, and the room, and may be changed by an operation of a character (for example, deformation of the ground, extension and demolition of the building, movement of furniture, operation of a clock, opening and closing of a door, and the like). The non-area information is synchronization target information other than the area information, and is mainly attribute information of the participant. The attribute information is a character, an owned item, a numerical value regarding a battle, an experience value regarding an action, and the like. The designation of the boundary of the distinction between the area information and the non-area information and the synchronization target object can be changed depending on the game design. For example, the area information manages the content of the area, and the result of the cooperative work is applied and held. On the other hand, the non-area information manages the states of the user who is active in the room and of the belongings of the user, and holds the ongoing work progress and the like (hereinafter, equipment and possession such as avatars, clothes, and weapons which are information uniquely managed and operated by the user such as the states of the user who is active in the virtual space and of the belongings of the user may be collectively referred to as user information. By sharing the user information with each other, participants in the virtual space (room) can recognize and share the activities of their avatars with each other). Representative examples of the area information and the non-area information include, but are not limited to, terrain information and user information. However, in the following description, the terrain information and the user information will be mainly described, but each description can be replaced with the description of the area information and the non-area information.

In a world such as a metaverse, and an MMOG, especially a first-person shooter (FPS) game, synchronization delay is fatal and the service does not work in this case. Therefore, a method has been devised to reduce the number of synchronization target objects and the number of participants.

In order to reduce the number of synchronization target objects, the design of a metaverse or a game needs to be devised. In order to reduce the number of participants, a virtual space to be shared is divided, or a plurality of the same virtual spaces (rooms, worlds) are prepared by setting a limitation on the number of participants. However, in this method, participants (participants in a parallel world state) in different rooms cannot share the game experience. Therefore, in order to completely share the game experience, it is desirable that all participants participate in the same room.

In a case where the number of shared objects and participants that can be accommodated in a single room can be increased, the degree of freedom in game design and the game experience of the participants can be greatly improved. Hereinafter, a configuration of a synchronization system for increasing the number of shared objects and participants that can be accommodated in a single room (world) and suppressing a synchronization delay will be described. Furthermore, a synchronization system for simplifying a method of specifying a room to participate, a method of selecting the room, and a method of sharing the room will be described. Furthermore, a synchronization system for facilitating custom (creation, editing, deletion, and the like) of a ground, a building, a room, and an object accompanying the ground, the building, and the room included in terrain information will be described.

(Configuration of Synchronization System)

FIG. 1 is a schematic diagram illustrating an example of a configuration of the synchronization system according to an embodiment.

This synchronization system is configured by connecting a server device 1 as an information processing device and terminal devices 2a, 2b, and 2c serving as clients in a mutually communicable manner through a network. The device and the network may be a cloud, a personal computer, a game terminal, a LAN, or the Internet, or may be a virtual machine, a virtual network, or the like.

The server device 1 is a server type information processing device which operates in response to a request from the terminal devices 2a, 2b, and 2c operated by operators, and includes, in a main body, electronic components such as a central processing unit (CPU), a hard disk drive (HDD), a flash memory, a volatile memory, and a (wireless/wired) LAN board having functions for processing information. The server device 1 communicates with the terminal devices 2a, 2b, and 2c and transmits and receives data to synchronize data handled by the terminal devices 2a, 2b, and 2c, and is, for example, a metaverse sever, game server or the like. Note that the server device 1 may be either configured with a plurality of clusters or configured to execute distributed processing. Alternatively, the server device 1 may be configured as a virtual machine in a cloud environment.

The terminal devices 2a, 2b, and 2c are terminal-type information processing devices which operate based on a program, and each include, in a main body, electronic components such as a CPU, a HDD, or a flash memory having functions for processing information. A program such as a metaverse, an MMOG, and the like, is installed in advance in the terminal devices 2a, 2b, and 2c, and thus the terminal devices operate based on the program, sequentially output data as a result of the operation to the server device 1, receive data as a result of the operation of another terminal from the server device 1, and frequently synchronize objects between the terminal devices 2a, 2b, and 2c. Note that, although three terminal devices 2 are illustrated, the number of terminal devices may be one or two, or may be four or more. It is preferable to provide a configuration in which communication is possible even in a case where the terminal devices are connected in the order of 1000 units. Note that the program such as a metaverse, an MMOG, and the like may be an independent application or a program that operates on a web browser.

The network is a communication network enabling high-speed communication, and is, for example, a wired or wireless communication network such as the internet, an intranet, a local area network (LAN), or a fifth generation mobile communication system (5G).

As an example, the server device 1 and the terminal devices 2a, 2b, and 2c operate to synchronize information (synchronization target object) held as an object in each device with the activity in a metaverse or the progress of a game between the devices, hold a copy of the object in each device as a replica (replicated object), and assist a synchronization operation by transmitting and receiving (relaying) the replica in order to copy and hold (as a tertiary copy) the replica in each device while managing ownership of the replica. Note that the server device 1 does not actually perform the synchronization operation but performs relay, but the relay for synchronization may be referred to as "synchronization" in a broad sense, and this operation may be referred to as the "synchronization operation", or the "synchronization processing". More specifically, a content of the replica in the server device 1 is updated only by the update of the object in a terminal device of a user that has the ownership, and the object (tertiary copy) in a terminal device of another user that does not have the ownership is updated by the synchronization operation. An object (tertiary copy), being not owned, in a terminal device of another user that does not have the ownership is not updated. Hereinafter, details of a configuration and an operation when the server device 1 serves as a relay server to synchronize an object between the terminal devices 2a, 2b, and 2c will be specifically described in the embodiment.

In addition, terms such as "object", "class", "field", and "instance" used in the present embodiment are used synonymously with those used in the context of, for example, Java (registered trademark), C++, C#, Python, JavaScript (registered trademark), Ruby, or the like, but hereinafter, the class and the instantiated class (instance) may be collectively referred to as an "object". A "class" is a collection of processes for executing a program, and the class includes a method for executing the processes and a field as a variable used when the method executes the processes. An object has zero or more fields, and each field has one or a plurality of field names and field values.

Figure 2:
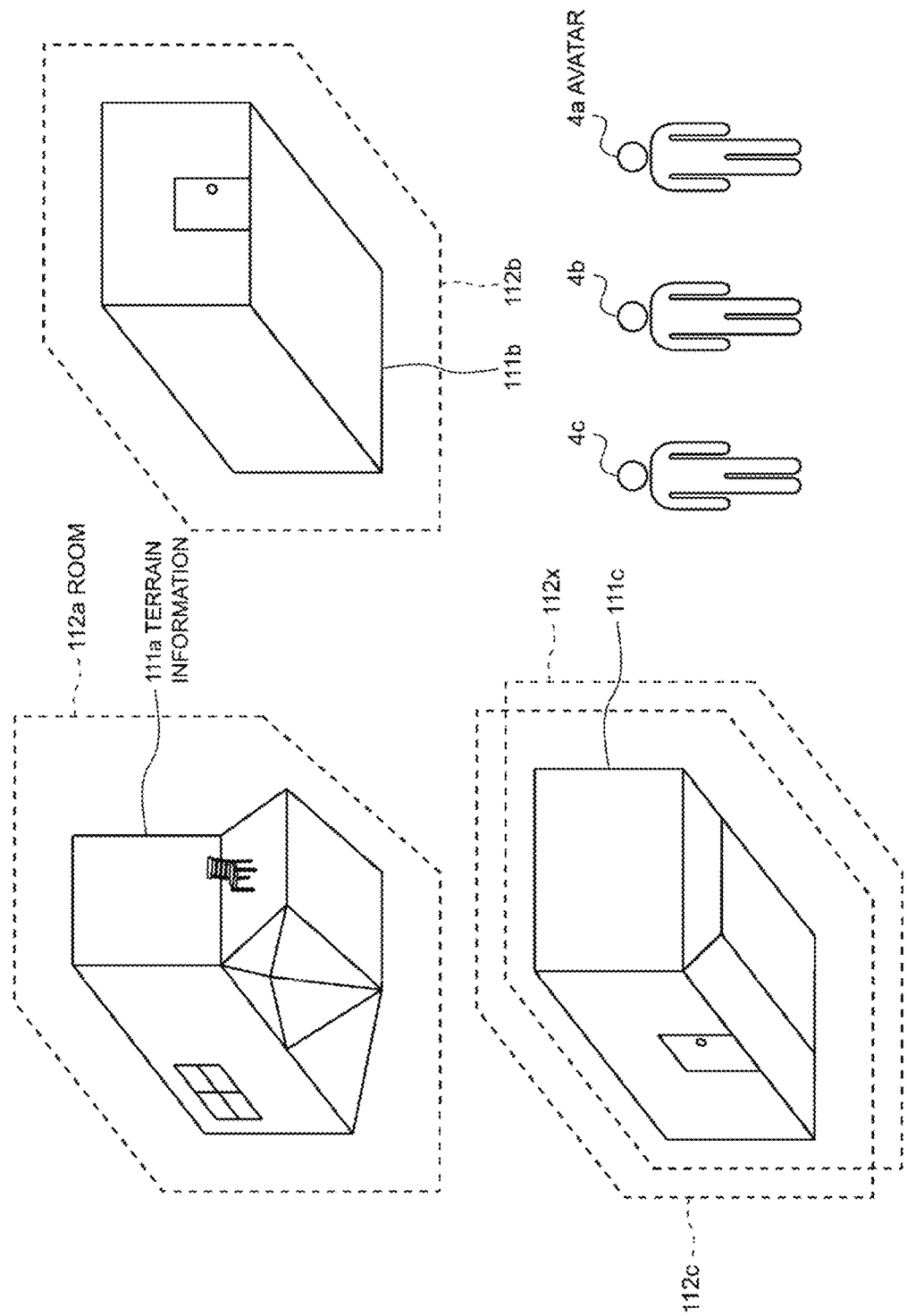
FIG. 2 is a schematic diagram illustrating a relationship between terrain information (area) and a room (world).

FIG. 2 is a schematic diagram illustrating a relationship between an area (terrain information 111) and a room (world).

The terrain information 111a to 111c as the area information is a definition of a terrain or a building (and its appendages) to be a scene of a metaverse or a game, and is, for example, a hobby world or a scene of a business freely created by an individual or a company. The server device 1 causes, when accepting the participation requests from users, avatars 4a to 4c that are the virtual selves of the users to participate in the rooms 112a to 112c corresponding to the terrain information 111a to 111c (hereinafter, participating in a room for experiencing an area that is the whole or a part of the virtual space may be simply described as "participating in the area". In a case where there is one room corresponding to an area, area participation and room participation have the same meaning. In a case where there is a plurality of rooms corresponding to an area, for example, in a case where a user participates in a specific room, it may be used strictly as "participating in a room" instead of "participating in an area". When participating in the virtual space, the user will typically participate in both the "area" and the "room"). The server device 1 may always hold all the area management information, all the room management information, and the replica management information 114 corresponding to each of the area management information and the room management information on the memory, but for operational purposes, it is realistic to hold only active management information (area management information, room management information, and replica management information) in which participants exist. That is, when all the avatars 4a to 4c disappear from a certain area or a certain room (the number of participants becomes zero), the server device 1 saves the corresponding setting value of the management information and temporarily deletes the setting value from the memory. In the case of this operation, the area management information, the room management information, and the replica management information corresponding to the respective area management information and room management information are made to participate in the corresponding management information when the corresponding management information (area management information, room management information, and replica management information) already generated at the time of accepting the participation request to the area is present in the server device 1, and when there is no part or all of the generated management information, the area management information, the room management information, and the replica management information are made to participate in the management information generated (restored) by the server device 1. In addition, in order to permanently accumulate the update result of the state of the managed object in each piece of management information (area management information, room management information, and replica management information) regardless of the persistence of the area or the room (more strictly, corresponding to the presence or absence of the area participant or the room participant, respectively) without being limited to the timing of storing the setting value before the deletion of the area or the room, each piece of content may be updated periodically at regular time intervals in order to synchronize the content with the change result of the replica management information so as to synchronize the object corresponding to the content held by the data management program 110, the area management information 111, and the room management information 112. Note that, for example, in a case where the room 112c is generated for one area (terrain information 111c) and the number of participants in the room 112c reaches an upper limit in terms of performance of the server device 1, another room 112x may be generated for the area (terrain information 111c). Even in this case, by synchronizing the terrain information 111c of the rooms 112c and 112x, the avatars participating in the rooms 112c and 112x can share the experience of changing the terrain information even if the avatars do not see each other's presence. For example, even if the existence of each other is not known, a change result of an area (terrain information 111) of construction work, excavation work, and the like that are sharable work for each room can be shared, so that the avatars participating in the rooms 112c and 112x can perform cooperative work. The participants in the room experience both the synchronization of the area management information and the synchronization of the non-area information (synchronization of information other than the area management information in the room, for example, an avatar, an object, and the like) (see FIG. 16 described later). The terrain information 111a to 111c is managed by an identifier called an area ID, and the rooms 112a to 112c and 112x are managed by an identifier called a room ID.

Note that, in order to participate in a room (participate in an area) in which the users experience the areas (terrain information 111a to 111c), for example, a uniform resource locator (URL, which may be read as a Uniform Resource Identifier (URI) in the context of the present embodiment) is used as an identifier unique to each of the areas (terrain information 111a to 111c). By inputting the URL into the web browser of each of the terminal devices 2a, 2b, 2c, . . . , the program for the metaverse or game is activated, and the participation in the room corresponding to the URL is processed. In a case where there is no room corresponding to the designated area (terrain information) in the server device 1 yet (not active), or in a case where all the rooms corresponding to the designated area (terrain information) are full, a participant participates in a room newly created by the server device 1, and in a case where there is a room corresponding to the designated area (terrain information) in the server device 1 and there is still capacity (such as room capacity) for accommodating participants, a participant participates in one room having the room capacity, in the middle. Furthermore, in order to directly designate and participate in the existing specific rooms 112a to 112c and 112x for intermediate participation by invitation from existing participants or the like, a unique URL may be designated for each of the rooms 112a to 112c and 112x. In that case, if the room in which the invited participant intends to participate no longer exists for some reason, such as when the invitee participant has left the room, this is not handled as an error and processing may be performed to prepare a new room to cause the invited participant to participate in without setting an error.

In addition, area IDs and owners are defined for the areas (terrain information 111a to 111c), and the user who is the owner can edit the contents of the areas such as the terrain information 111a to 111c. Also when editing the terrain information 111a to 111c, a URL unique to the area (the terrain information 111a to 111c) is used, a page of terrain editor is accessed by the web browser of the terminal devices 2a, 2b, 2c . . . , and the corresponding terrain information is loaded and can be edited by inputting the URL in the page. Note that various existing authentication methods may be applied to authentication at the time of participating in a room or authentication at the time of starting terrain editing of an area, terminal device authentication and user ID/password authentication being applicable. Therefore, the ownership is not necessarily uniquely associated with the terminal device, and thus a user can appropriately participate in as the owner and edit the terrain information from another terminal.

(Configuration of Server Device)

Figure 3:
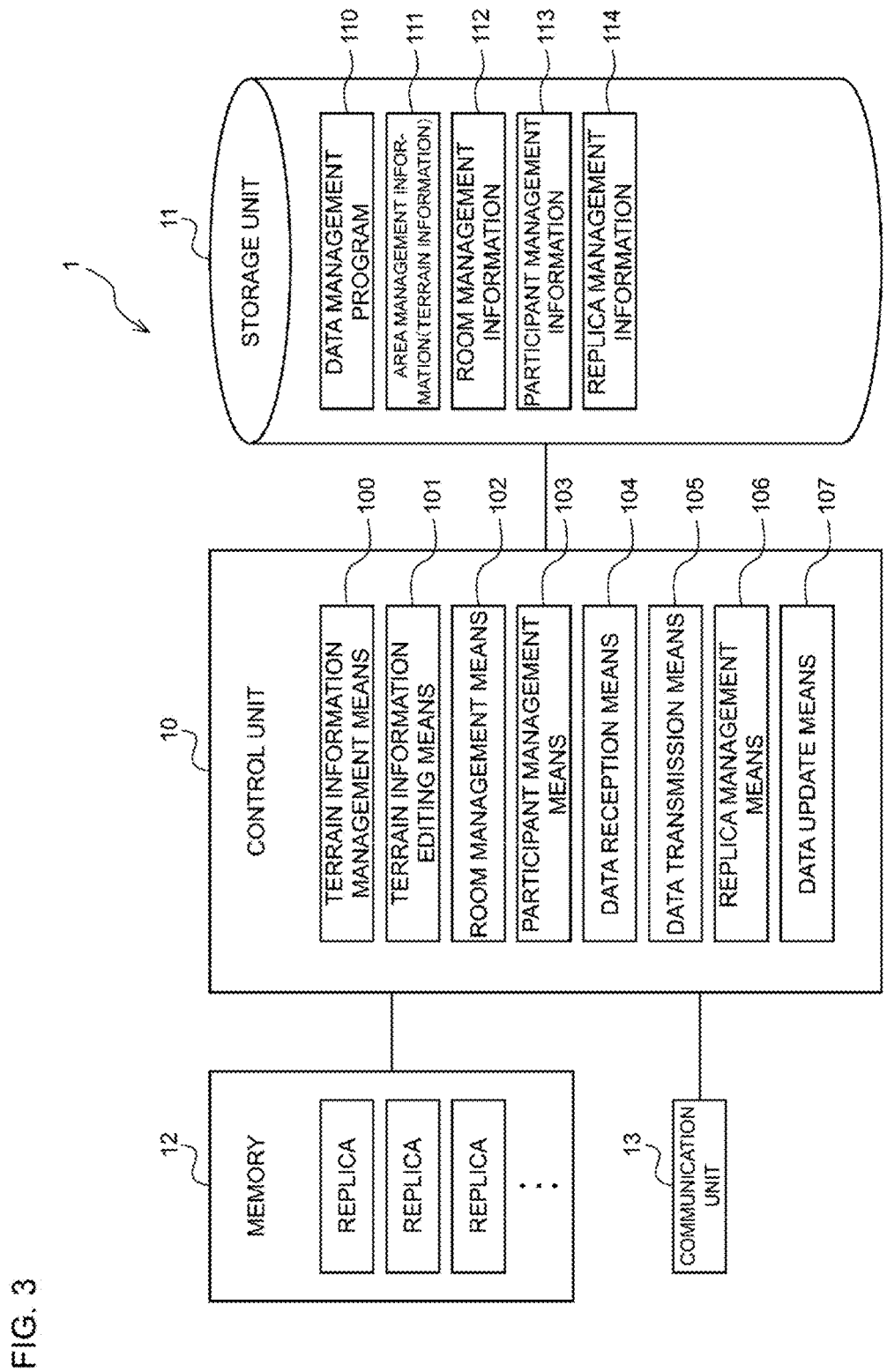
FIG. 3 is a block diagram illustrating an example of a configuration of a server device according to the embodiment.

FIG. 3 is a block diagram illustrating a configuration example of the server device 1 according to the embodiment.

The server device 1 includes a control unit 10 that includes a central processing unit (CPU) and the like, controls each unit, and executes various programs, a storage unit 11 that includes a storage medium such as a flash memory and stores information, a memory 12 that includes a volatile storage medium and temporarily stores information, and a communication unit 13 that communicates with the outside through a network.

The control unit 10 functions as terrain information management means 100, terrain information editing means 101, room management means 102, participant management means 103, data reception means 104, data transmission means 105, replica management means 106, data update means 107, and the like by executing a data management program 110 as a data synchronization program.

The terrain information management means 100 manages the terrain information 111 which is a terrain or a building (and its appendages) which is a scene of a metaverse or a game. Specifically, loading the terrain information 111 into the room, managing the area ID, issuing the URL as an example of the identifier corresponding to the terrain information 111, updating the terrain information 111, and the like are performed. Note that the identifier is not limited to the URL, and preferably a general-purpose identifier that can be used in an open environment without being used only in a specific MMOG or a metaverse application. However, the identifier may be an object ID, a universally unique identifier (UUID) of an object, or the like, a part of the identifier, a character string including the identifier, or a byte string that is an operation result such as compression or encoding of the identifier or the character string.

The terrain information editing means 101 edits the terrain information 111, particularly the terrain data, in response to a request from each of the terminal devices 2a to 2c. The terrain data is specifically terrain, buildings, and appendages of the terrain and buildings, and the terrain information editing means 101 changes the shape and arrangement of the terrain and buildings, changes the operation content of the appendages of the terrain, and the like. In addition, a program (script) describing an operation (for example, opening and closing of a door, or the like) accompanying the terrain data is edited. Although not illustrated, editing means corresponding to the non-terrain information, for example, an avatar, a monster, equipment such as a vehicle, a chat bulletin board, and the like may be provided similarly to the terrain information editing means 101.

The room management means 102 performs generation, temporary stop, restart, deletion, and the like of a common virtual space called a room to which a normal room ID is assigned, and manages the room management information 112 according to these operations.

The participant management means 103 records, for a participant participating in a room, a user ID of the participant, a socket ID of a terminal device of the participant, and the like, and stores them in a storage unit 11 as participant management information 113 of the room. In a system that only provides a single virtual space, it may be unnecessary to distinguish between rooms, and thus, a room ID may be unnecessary.

The data reception means 104 receives and replicates an arbitrary number of (0 or more) objects (including terrain data) as data of a synchronization target owned by each of the terminal devices 2a, 2b, and 2c via a communication unit 13, and stores a replica 120a, a replica 120b, and a replica 120c in the memory 12 as replicated objects. Data to be synchronized includes the terrain information 111 loaded into the room and objects such as participants and items of the room. The synchronization object related to the area management information is managed in units of areas (replica management information 114A), and the synchronization object related to the non-area information is managed in units of rooms (replica management information 114B).

The data transmission means 105 transmits the replica 120a, the replica 120b, and the replica 120c to a terminal determined as a transmission destination based on the participant management information 113 and a transmission rule of replica management information 114A or 114B via the communication unit 13.

When the replica 120a, the replica 120b, and the replica 120c are generated, the replica management means 106 records replica IDs of the replica 120a, the replica 120b, and the replica 120c, a user ID of an owner that has ownership of the replica with the replica ID, a transmission rule indicating a user to be synchronized, and a policy of transfer permission or the like, and stores the replica of the area information and the replica of the non-area information in the storage unit 11 as the replica management information 114A in units of areas and the replica management information 114B in units of rooms, respectively.

In a case where the objects corresponding to the replica 120a, the replica 120b, and the replica 120c are updated, a difference thereof is received from the terminal device of the user that has the ownership based on the replica management information 114A or 114B by the data reception means 104, and the data update means 107 updates the corresponding replica. Note that it is preferable to receive the difference from the viewpoint of suppressing an information amount of the network, but the updated object itself may be received. Furthermore, the data transmission means 105 transmits the difference to the terminal determined as the transmission destination based on the participant management information 113 and the replica management information 114A or 114B. Note that it is preferable to transmit the difference from the viewpoint of suppressing an information amount of the network, but the updated object itself may be transmitted. Note that the replica management information 114A is used to manage synchronization target objects of the terrain information 111, and the replica management information 114B is used to manage synchronization target objects, including characters such as avatars, items, etc., of non-area information.

The storage unit 11 stores the data management program 110 that causes the control unit 10 to operate as the means 100 to 107 described above, the terrain information 111, the room management information 112, the participant management information 113, the replica management information 114A and 114B, and the like. A relational database, a file system, or the like is used as the storage unit. Note that, in order to increase the speed, an in-memory database such as Redis may be used or used in combination.

The memory 12 temporarily stores the replicas 120a, 120b, 120c, and the like and other information.

Note that the terminal devices 2a, 2b and 2c each include an operation unit and a display unit in addition to the same configuration as the server device 1. Description is omitted for the common configuration with the server device 1.

Figure 4:
FIG. 4 is a diagram illustrating a configuration of terrain information (area management information).

FIG. 4 is a diagram illustrating a configuration of management information of all areas (all pieces of terrain information 111).

The terrain information 111 is information regarding terrain, buildings, and appendages of the terrain and the buildings to be loaded into a room that is a virtual space, and when one virtual space (area) is created, one piece of terrain information (corresponding to one row in FIG. 4) is created. The terrain information 111 includes an area ID for identifying terrain information, terrain data indicating a terrain, a shape and an arrangement of a building, an operation content of an appendage of the terrain, and the like, a URL for designating an area to participate in for experiencing the virtual space represented by the area or accessing an editing page of the terrain information to be described later, an update date and time which is a date and time when the terrain information is updated, a creator indicating a participant ID that created the room, an owner or editor indicating a participant ID that has ownership or editing rights to the room, a transmission destination rule to transmit a replica of the terrain information for synchronization, a new room creation rule defining a rule when creating a new room using the terrain information 111 in which the room has already been created, and the like. Note that there may be a plurality of creators, owners, and editors. Furthermore, in a case where the owner of the terrain information 111 does not have the editing right, a temporary editing right may be granted to the owner. The new room creation rule may define a condition such as "2,000 or more participants", or may respond to a request from the outside such as "responding to a request of a participant". The area ID and the URL are generated when the terrain information editing means 101 creates the terrain information (for one row). The terrain data is updated in accordance with creation and editing by the terrain information editing means 101, and further in accordance with an activity result in which participants in the area affect the terrain information. For example, one or a plurality of participant IDs such as a creator (creation is only allowed), an owner (creation, erasure, editing, reference, and transfer of ownership are all allowed), an editor (editing and reference are only allowed), and a referrer (reference is only allowed) are specified and managed according to various operation authorities (creation, erasure, editing, reference, transfer of ownership) for the terrain information. Furthermore, as the URL, for example, in response to a request of the owner, the URL itself or the equivalent URL to which an operation such as shortening is added is issued, and the owner discloses the URL to another participant or a person who does not know the virtual space providing service at all (a person who is unregistered/nonuser and a potential new registered person/new participant of the virtual space providing service), so that even a user of the virtual space providing service or a potential user who has not used the virtual space providing service at all can be invited to participate in the virtual space only by the URL. However, the unregistered person of the virtual space providing service may need registration or download of the virtual space service before participating in the virtual space.

FIG. 5 is a diagram illustrating a configuration of room management information 112.

The room management information 112 includes a room ID for identifying a room that is a virtual space, an area ID indicating the terrain information 111 developed in the room, a URL for participating in the room, a generation date and time that is a date and time when the room is generated, and the like.

Figure 6:
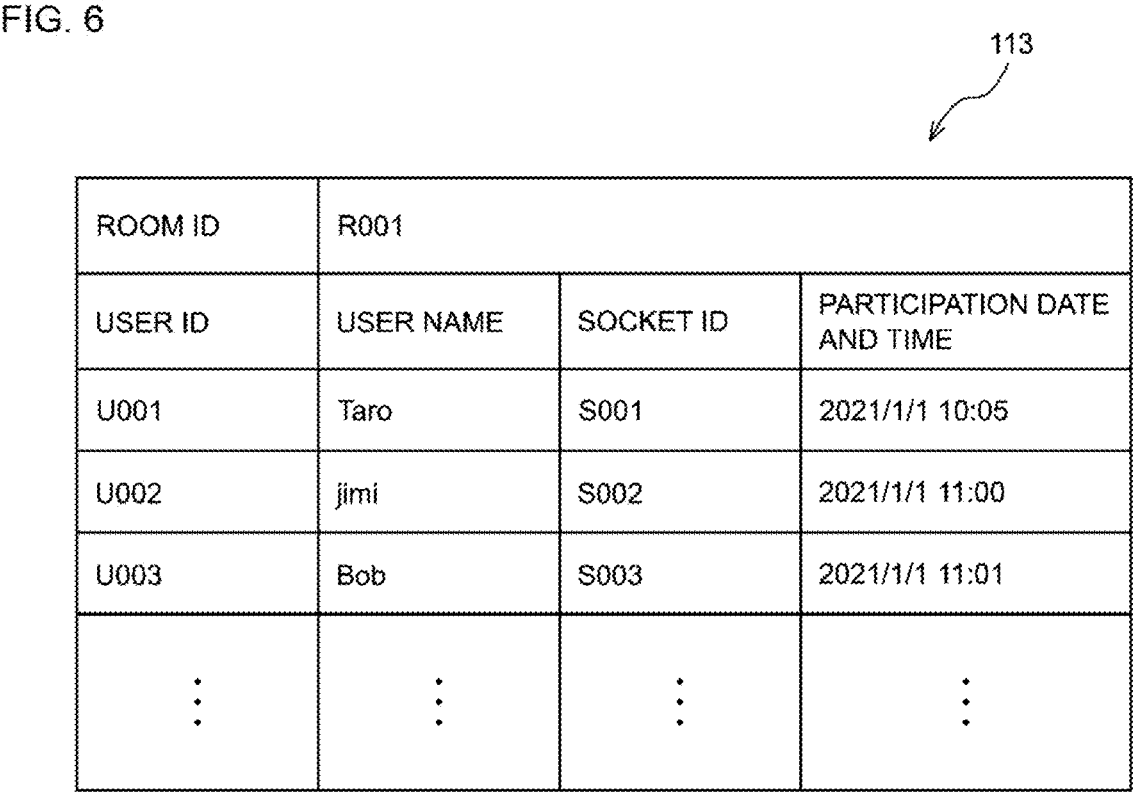
FIG. 6 is a diagram illustrating a configuration of participant management information of a certain room.

FIG. 6 is a diagram illustrating a configuration of the participant management information 113.

The participant management information 113 is created for each room that is a virtual space, and includes a user ID for identifying a participant, a user name of the participant, a socket ID of a socket (TCP socket or UDP socket) including information necessary for transmission and reception of an IP address, a port number, and the like of the terminal device operated by the participant and the server device 1, and a participation date and time indicating a date and time of participation in the room. Furthermore, a role of the participant in the room, a group to which the participant belongs, transmission at the time of updating the shared object, a selection rule for a synchronization target object to be received (a close object or an object in view), a reception format, or a preference thereof (default) may be described.

FIG. 7 is a diagram illustrating a configuration of replica management information 114A of the synchronization target object related to terrain information managed for each area.

The replica management information 114A of terrain information is created for each area which is (a template of) the virtual space, and includes a list of active room IDs of the area, a replica ID for identifying a replica, an owner indicating a participant ID that has ownership of the replica, a transmission rule for transmitting the replica for synchronization, and transfer indicating whether or not the transfer of the ownership of the replica is permitted. The active participants in the area can be acquired by referring to the list of room IDs and referring to the participant management information 113 of each room, but the active participant list may be redundantly held in the replica management information 114A of the terrain information (it is also necessary to update the active participant list in synchronization with the update of the participant management information 113 of the room). Furthermore, in a case where the transfer can be performed, a rule of the transfer method, a data format in transmission and reception at the time of updating the object, or a preference thereof may be described. Note that the transmission rule may be defined based on the performance of the client terminal, the network status of the client terminal, the role of the user that has ownership, and the belonging group. It is inherently desirable that the object owner regarding the terrain information is the owner of the entire area, but it is not realistic to assume that the owner always participates in the room of the area. In a general use form, for all replicas, the owner of a synchronization object related to terrain information is a special user (such as a dummy client) such as a system or the oldest participant participating in a room corresponding to an area. In a case where the dummy client is used, the dummy client may be prepared on the server device 1 or the other server, and the dummy client may be the owner of the terrain information 111. Note that, here, the "dummy client" operates, for example, on the server device 1, and operates a part or all of software of the client and participates in the synchronization group to perform synchronization operation with clients of other synchronization groups. Here, even in a case where there are a plurality of rooms corresponding to an area, the oldest participant is a participant who has participated first in the area or a participant who is second oldest if the oldest participant such as the first participant exits from the area. When the owner has to be determined instead of the oldest participant, another method may be used, for example, a participant with the smallest participant ID. Although most terrain information (for example, ground shape information G1 and G2 and building information B1) should be transferred and maintained, there may be things that do not need to be transferred, such as special work marks (e.g., M1).

In a case where the dummy client is the owner (of the synchronization target object), the dummy client is activated when any room in the area is activated, acquires the area information from the area management information 111, and creates and holds a primary of the synchronization target object of the area. Furthermore, in a case where the oldest participant is the owner (of the synchronization target object), the participant acquires the area information from the area management information 111 when participating in the room of the area. In a case where other participants (one of the participants is the oldest participant) exist in the area, the participant acquires a replica of the synchronization target object of the area from the server device 1, and generates and holds a tertiary. If there is no participant in any room in the area (including a case where there is no room), that is, if the participant is the first participant in the room in the area, the participant is the oldest participant in the area, acquires the area information from the area management information, and creates and holds a primary for the synchronization target object in the area.

FIG. 8 is a diagram illustrating a configuration of replica management information 114B of non-area information in a certain room.

The replica management information 114B of the non-area information is created for each room that is a virtual space, and includes a replica ID for identifying a replica, an owner indicating a participant ID that has ownership of the replica, a transmission rule for transmitting the replica for synchronization, and transfer indicating whether or not the transfer of the ownership of the replica is permitted. Furthermore, in a case where the transfer can be performed, a rule of the transfer method, a data format in transmission and reception at the time of updating the object, or a preference thereof may be described. Note that the transmission rule may be defined based on the performance of the client terminal, the network status of the client terminal, the role of the user that has ownership, and the belonging group ("group a" in FIG. 8), or may be defined based on criteria such as being close to the object, being in view, or the like ("within distance of 50" in FIG. 8). Alternatively, the transmission rule may be defined based on the performance of the client terminal and the network status of the client terminal. The participants in the room can be acquired by referring to the participant management information 113, but the participant list may be redundantly held even in the replica management information 114B of the non-area information (it is also necessary to synchronize and update the participant list at the time of updating the participant management information 113 of the room).

(Operation of Information Processing Device)

Next, effects of the present embodiment will be discretely described in (1) Basic Operation, (2) terrain Information Editing Operation, (3) Synchronization Operation, and (4) Intermediate Participation/Exit Operation.

(1) Basic Operation

A plurality of users participate in a virtual space (room) loaded with certain terrain information 111 (area) in order to synchronize a plurality of objects and share an experience (metaverse, gameplay) in the same virtual space (room, world). Note that, in "(3) Synchronization Operation", for the sake of simplicity in the description of the synchronization operation of the object, an example of the metaverse that provides only a single virtual space will be mainly described. In a case where the same terrain information 111 (area) is loaded into a plurality of virtual spaces (rooms), the synchronization operation of the terrain information 111 is determined on the basis of the design and the policy of the metaverse or game. As a specific example of the synchronization operation of the terrain information 111, the non-area information may be synchronized for each room, and the rooms belonging to the same area may be collectively synchronized for each area (see FIG. 16). Note that, for an avatar or an appendage of the avatar subjected to the synchronization operation in the room, or a synchronization target object associated with the avatar or the appendage, each participant terminal in the room holds ownership of its own avatar or the like, but since a synchronization group is the same for all synchronization target objects in the participant terminal in the room, it is efficient to manage a plurality of objects in units of rooms in a single synchronization group, as shown in FIG. 114B. Of course, it may be managed as a plurality of synchronization groups instead of a single synchronization group, or may be managed for each synchronization target object. The same applies to the terrain information in the area, and as illustrated in FIG. 114A, a plurality of terrain objects may be managed in a single area group in units of areas.

The users 3a, 3b, and 3c operate the terminal devices 2a, 2b, and 2c to connect to the server in order to participate in the virtual space (designated area) desired by the metaverse, and directly participate in the room corresponding to the terrain information 111 (area) in which a desired room, an event venue, or the like is prepared, by using the URL uniquely prepared for each area ID of the terrain information 111 as the participation method. In order to start an application from the URL, in particular the specific state of the application (specific location, position in the virtual space. For example, a state where a participant's avatar is sitting at a particular location, such as on a chair in a room), techniques such as URL schemes, deep links, universal links, and the like can be utilized. Therefore, it is not necessary to perform a step of repeating various searches, selections, and movements in the virtual space after starting the application and finally reaching the room in which a user participates.

Furthermore, in order for a participant who is participating in the room to invite another participant to the same room in order to have a virtual experience in the room together with other participant, the other participant can easily join the same room by sharing the URL corresponding to the room (in some cases, the area) in which the participant participates, by e-mail or message. Alternatively, in a metaverse such as an exhibition, a participating company notifies a customer of a URL corresponding to an area in which the company exhibits by a method such as a poster, a pamphlet, a business card, an e-mail, or a social networking service (Twitter, Facebook, etc.), so that the customer can directly participate in a room of the company to which the customer is invited without stopping by a room of another company.

That is, it is assumed that the terminal devices 2a, 2b, and 2c start the application for metaverse via the browser to which the URL on the terminal is input, the application downloads the terrain data of the terrain information 111 (area) (including the non-synchronization target object and the operation program and script of the object) from the server device, further makes a request for participation in the room to the server device 1, and starts the synchronization processing of the area information and the non-area information. Note that synchronization target information (parameters such as position) for downloading the terrain data is described in the data reception means 104. Specifically, a participant of the first room belonging to the area holds a primary copy in the participant itself and creates a replica also in the server, and subsequent participants acquire a replica in the server and create a tertiary and initialize a parameter (synchronization target object) necessary for synchronization.

Note that the area (terrain information 111) corresponds to the content of the virtual space. In a game such as a typical MMOG, update of the client program due to the addition or correction of the content is necessary. However, by configuring such that the terrain information is downloaded every time as in the present embodiment, update if the client program due to the addition or correction of the content is not necessary. In particular, in a metaverse that provides a huge amount of content (area), it is inefficient or sometimes impossible to include and hold all content in a client program. On the other hand, in the case of downloading each time, since the user can participate in the room only after the content is downloaded, the waiting time for participation in the room may become a problem. Instead of downloading each time, the content downloaded once may be cached, the content in the cache may be reused in a case where the content is not updated, or the content to be used next may be predicted and downloaded in advance.

Upon receiving the request from the terminal devices 2a, 2b, and 2c, the room management means 102 of the server device 1 refers to the room management information 112 to confirm whether a room is prepared for the corresponding area ID. In a case where the room is not prepared, or in a case where the room already exists but the participant management means 103 determines that the new room creation rule of the terrain information 111 is satisfied (for example, when it is determined that the participants in the room have reached the upper limit), a new room is prepared, and the terrain information 111 is loaded into the new room and provided. In a case where the area provides a plurality of rooms, the room management means 102 associates a plurality of room IDs with one area ID, the participant management means 103 manages a participant participating in the room for each room ID by the participant management information 113, and the replica management means 106 manages the owners of the area information and the replica of the area information handled in the room by the replica management information 114A of the area information (area) or the replica management information 114B of the non-area information (room).

Once the participation request for the room is received, the participant management means 103 of the server device 1 records a user ID, a user name, a socket ID, and a participation date and time together in the participant management information 113 associated with the room ID of the storage unit 11.

Note that there are various forms of participation in the room depending on the design of the metaverse and the terrain information 111. The present embodiment assumes a mode in which a URL corresponding to an area or a room desired to participate is designated, and the user directly participates in a room of a specific area (terrain information) or a specific room already existing, but the present embodiment can also be applied to other modes. In a case where only a single room is provided in the entire virtual space (single terrain information and single room), all participating users (e.g., logged-in users) participate in the default room. In a case where a plurality of rooms are provided in the entire virtual space, there is also a mode in which a participating user enters a special room called a lobby corresponding to a waiting place (there may be a plurality of lobbies in a case where there is a limitation on the number of participants) and then moves to a target room. Furthermore, in a case where a plurality of rooms are provided in a single area (terrain information) (parallel world), there is also a mode in which the user returns to the room in which the user has previously participated. In a case where a room is newly created, the metaverse may be started by one person, or may be started at an appropriate timing after several participants gather. Furthermore, in a case where the metaverse has already been started in the room, participation of a participating user is treated as intermediate participation (see "(3) Intermediate Participation/Exit Operation" to be described later). In the present embodiment, the method of participating in the room is not particularly limited. In a case where a plurality of rooms are prepared, the rooms are managed by the room management information 112.

During the action in the metaverse or game, the terminal devices 2a, 2b, and 2c sequentially generate, update, and delete terrain information 111 and a plurality of objects (characters, weapons, items, and the like) in accordance with the execution of the program. The server device 1 performs a relay operation for synchronizing terrain information 111 and objects (hereinafter referred to as a "synchronization target object") in the terminal devices 2a, 2b, and 2c. Hereinafter, first, in "(2) Terrain Information Editing Operation", an editing operation of the terrain information 111 will be described, and in "(3) Synchronization Operation", for example, a synchronization operation will be described for a case where a new synchronization target object is generated in the terminal device 2a after all the terrain information 111 and objects of the terminal devices 2a, 2b, and 2c are synchronized during the action in the metaverse.

(2) Terrain Information Editing Operation

First, the user 3a operates the terminal device 2a to edit the terrain information 111, activates the web browser, connects to a site for editing the terrain information, and logs in. Furthermore, in order to designate an area ID to be edited, as illustrated in terrain information 111 of FIG. 4, a URL associated with the area ID is input to a site on the web browser. However, it is assumed that a user who can edit the terrain information 111 (a user that has an editing right) is the owner with the corresponding area ID in the replica management information 114A as illustrated in FIG. 7, but the editing right may be set to a user different from the owner with the area ID.

Upon receiving access from the terminal device 2a by the URL, the terrain information editing means 101 of the server device 1 specifies an area ID from a character string included in the URL, checks the area ID against the user ID of the user 3a, confirms whether the user is an owner in the replica management information 114A, and controls the terminal device 2a to display a screen for editing terrain data corresponding to the area ID in a case where the user is the owner.

While checking the screen displayed on the terminal device 2a, the user 3a edits a program or the like for providing a ground, a building, a room, and accompanying objects of the ground, the building, and the room, services, and the like. The edited content is transmitted from the terminal device 2a to the server device 1, and when the ground, the building, the room, and the accompanying objects of the ground, the building, and the room are edited, the terrain information editing means 101 updates the terrain data of the terrain information 111.

Normally, the terrain data of the terrain information 111 is edited when the terrain information 111 is not loaded (when there is no room). Note that, if the design and the policy of the metaverse or game allow, the editing of the terrain data of the terrain information 111 may be performed in a case where the terrain information 111 is loaded (in a case where a room is present). In this case, the difference between the unedited terrain data and the edited terrain data is treated as the difference of the synchronization target object to be described in "(3) Synchronization Operation". Similarly, in a case where the terrain information is changed due to the progress of the metaverse or game, the difference due to the change needs to be reflected in the terrain information 111 to be edited, and thus, is treated as the difference of the synchronization target object to be described in "(3) Synchronization Operation". Note that editing of the terrain information 111 refers to editing of a primary copy to be described in "(3) Synchronization Operation".

(3) Synchronization Operation

Figure 9:
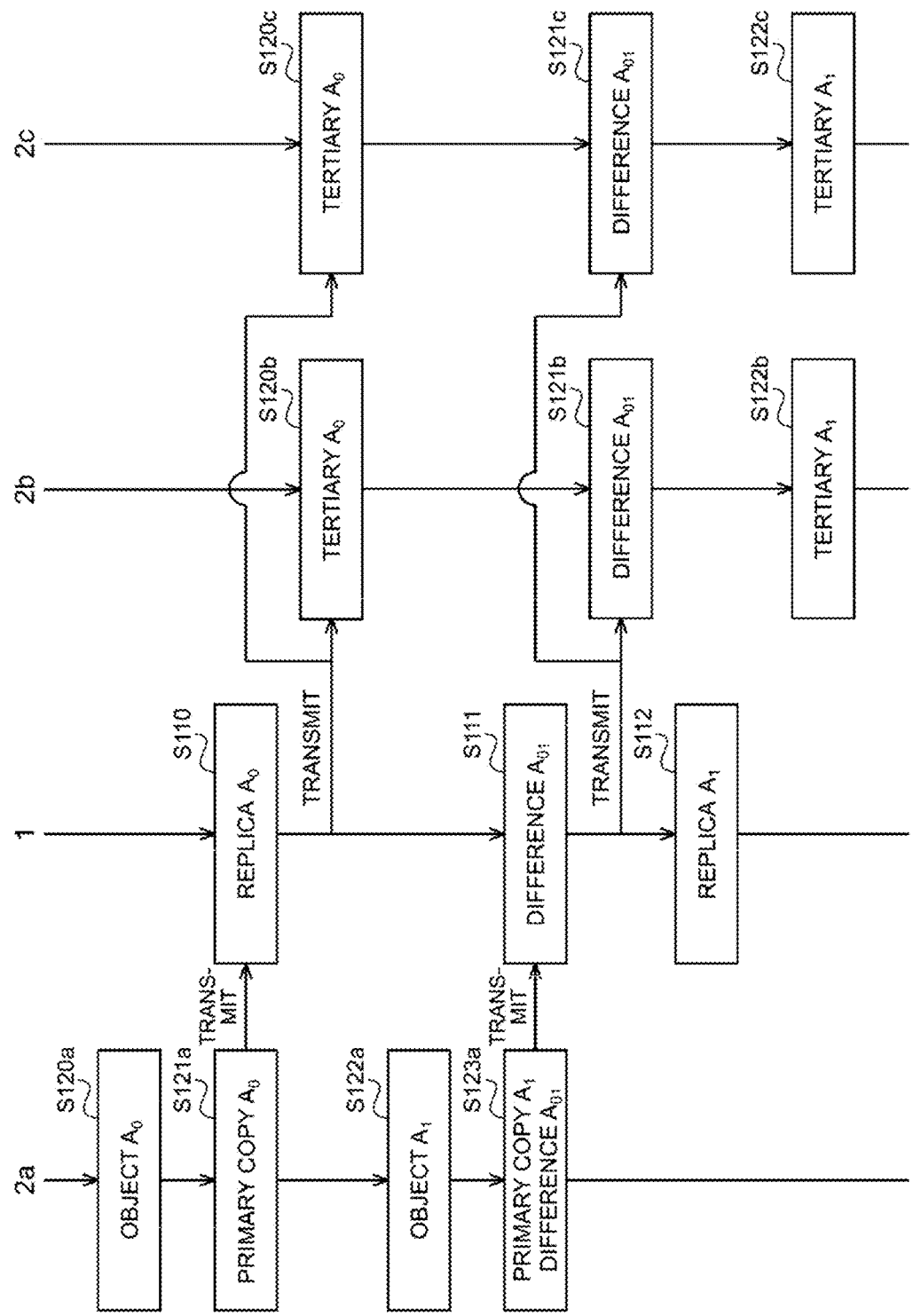
FIG. 9 is a flowchart for describing an example of a synchronization operation.

FIG. 9 is a flowchart for describing an example of the synchronization operation of the non-area information. The synchronization operation of the non-area information is realized as follows: the terminal device transmits the change of the object (primary copy) owned by the terminal device to the server device 1 while referring to the replica management information 114B of the non-area information, the server device 1 updates the corresponding replica and transmits the update information to the terminal device that does not have the ownership of the object corresponding to the transmission destination rule with reference to the room participant list, and each terminal device received the update information updates the object (tertiary) not owned by the terminal device. Furthermore, the area information synchronization operation is also realized in a substantially similar manner. However, the range of object synchronization (the difference between the room and the area) and the method of selecting the owner of the object (the owner of the area is not always online) are different. The participant list to be synchronized is not necessarily for participants in the same room, and when there are a plurality of rooms in the same area, the participant list is for participants in all the rooms corresponding to the same area. Therefore, the owner of the replica of the area information is not necessarily a participant of the same room. The original owner of the object should be the owner of the area, but is not necessarily always online. If the owner of the area is not participating in the room of the area, another participant needs to be the owner. Therefore, the owner is a special user provided by the system (such as a dummy client) or a participant (the participant whose room participation duration corresponding to the area is the longest, or may be a participant in another room if there are multiple rooms) in a room in the area from the earliest. When the owner of the area returns to the room of the area, the ownership may be transferred to the owner of the area by the same procedure as the intermediate exit described later.

Figure 16:
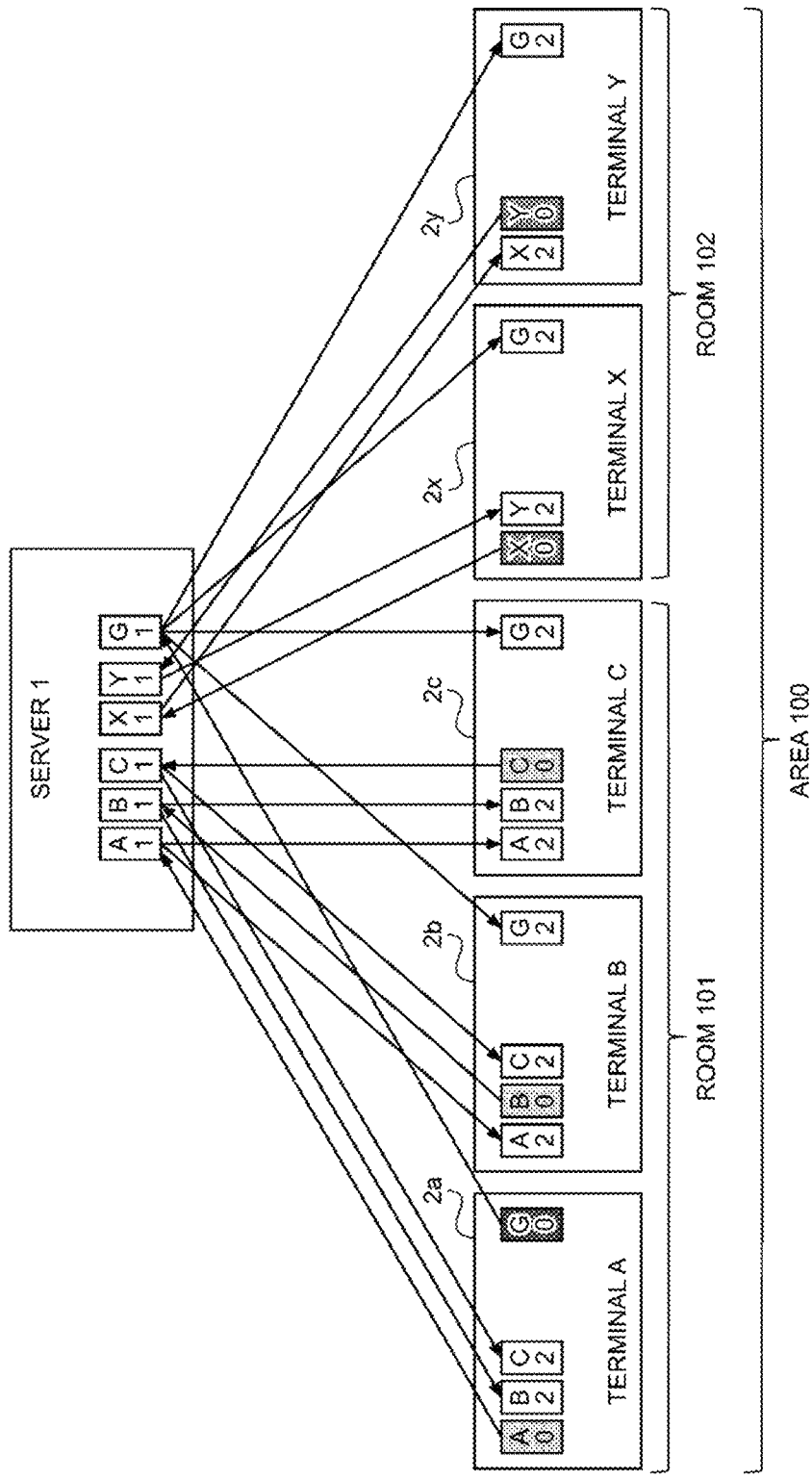
FIG. 16 is a diagram illustrating a relationship between synchronization operations of synchronization objects of area information managed for each area and synchronization objects of non-area information managed for each room.

FIG. 16 illustrates a relationship between area information synchronization processing (replica management information 114A) and non-area information synchronization processing (replica management information 114B) in a case where there are a plurality of rooms in an area. The basic synchronization mechanisms (primary copy, replica, tertiary) are all the same.

Note that, in FIG. 16, the relationship between the area and the room is an inclusion relationship in which the synchronization target clients in the area belong to a plurality of rooms and each include a plurality of terminal devices (clients) that perform synchronization operation. However, the synchronization operation of the present embodiment is not limited to the inclusion relationship because a synchronization group is defined for each object. Therefore, more generally, the client has a plurality of synchronization target objects, and each synchronization target object can also be used in a more flexible configuration with an owner of a different object and a synchronization target group. Specifically, the group to be synchronized is defined for each object, for each party (group), distance, purpose, or the like, and the groups may be independent of each other or may overlap each other.

For example, in a case where synchronization is performed for each room, the synchronization group includes clients configured to synchronize user information among the synchronization target objects with each other. Furthermore, in a case where synchronization is performed for each area, the synchronization group includes clients configured to synchronize terrain information for reproducing content constituting a virtual space among the synchronization target objects.

First, the terminal device 2a generates an object $A_O$ as a new synchronization target object as the metaverse or game progresses (S120a). Next, the terminal device 2a generates a primary copy $A_O$ of the object $A_O$ (S121a) and transmits the primary copy $A_O$ to the server device 1. Note that the reason for generating the primary copy is that the object $A_O$ changes over time, and thus the primary copy is generated as data indicating a state of the object at a certain timing (a predetermined synchronization timing, a timing at which a change occurs, or the like) and treated as synchronization information. In addition, another reason for generating the primary copy is that information used in the previous synchronization may be necessary to confirm a difference caused by a change over time in the subsequent synchronization. Meanwhile, depending on the implementation, the object $A_O$ may be directly treated as the synchronization information and transmitted to the server device 1 without creating the primary copy. Alternatively, in particular, for a composite object including a plurality of objects, a combination of both the object and the primary copy may be used. In the following description, the primary copy and the synchronization target object are not strictly distinguished.

The data reception means 104 of the server device 1 receives and replicates the primary copy of the object as data of a synchronization target from the terminal device 2a via the communication unit 13, and stores the replica $A_0$ in the memory 12 as a secondary copy (S110).

When the replica $A_0$ is generated, for example, the replica management means 106 of the server device 1 records an owner "U001" of the replica $A_0$ (the user of the terminal device 2a), a transmission destination rule, "a user other than the owner", who is other than the user of the terminal device 2a, and a policy of transfer permission, e.g., "permitted", updates the replica management information 114A or 114B, and stores the replica management information 114A or 114B in the storage unit 11. The policy may be fixedly defined (for example, as a default, the transmission destination is all room participants other than the owner, the transfer is not permitted, and the like) for each type of object, may be designated when the terminal device 2a creates the object, may be designated or changed at any time by the terminal device 2a that has the ownership according to the progress of the game, or may be designated in such a way that the replica is temporarily not received by the terminal device 2b as the transmission destination due to a long distance from the terminal device 2a in the virtual space or the like.

Next, the data transmission means 105 of the server device 1 transmits the replica $A_0$ to the terminal devices 2b and 2c (by referring to the participant management information 113 and the like as necessary) of the users defined as the transmission destinations based on the replica management information 114A or 114B via a communication unit 14.

The terminal devices 2b and 2c receive and replicate the replica $A_0$ from the server device 1, and store a tertiary $A_0$ as the tertiary copy in the memory (S120b and S120c). The terminal devices 2b and 2c progress the metaverse or game based on the object synchronized by the tertiary $A_0$. Note that, in a case where a difference of the tertiary is updated in a subsequent step, it is necessary to devise not to directly change the tertiary according to the progress of the metaverse or game. In a case where a content of the tertiary is changed in motion prediction for reducing interaction and lag according to the progress of the metaverse or game, the operation is performed in advance with the progress of the metaverse or game using a copy of the tertiary for the progress of the metaverse or game. In a case where difference update information is transmitted from the server device 1 later, the copy of the tertiary for the progress of the metaverse or game is replaced and synchronized with the tertiary to which the difference is applied and updated. When instantaneous replacement is made, in a case where the difference is large or the motion is not smooth, a field value of the copy of the tertiary may be smoothly matched with a field value of the updated tertiary over time, for example, to improve user experience.

Next, the terminal device 2a further changes a field value and the like of the object $A_0$ with the progress of the metaverse or game to obtain an object $A_1$ (S122a). Next, the terminal device 2a updates the primary copy corresponding to the object $A_1$ (primary copy $A_1$), generates a difference $A_0$ from the primary copy $A_0$ corresponding to the object $A_0$ (S123a), and transmits update information of the changed field as the difference $A_0$ to the server device 1. Preferably, among all the fields of the synchronization target object, only for a field of which a difference from the previous synchronization information transmission is sufficiently large to exceed a threshold determined in advance according to the metaverse or game content and which need to be updated to maintain the synchronization state is transmitted, a pair of a field name and a field value and only the number of fields that need to be updated are collectively transmitted as list information. In a case of the number is zero, no transmission is performed, or transmission is performed with zero updates. In addition, in a case where the field name is long, a data serialization technique of coding the field name into a number or the like and compressing the data size may be used.

The data reception means 104 of the server device 1 receives the difference $A_0$ from the terminal device 2a via the communication unit 13 (S111), and updates the replica $A_0$ of the memory 12 to a replica A by the data update means 107 (S112).

Next, the data transmission means 105 of the server device 1 transmits the difference $A_0$ of the replica $A_0$ to the terminal devices 2b and 2c determined as the transmission destinations based on the replica management information 114A or 114B via the communication unit 14.

The terminal devices 2b and 2c receive the difference $A_0$ from the server device 1 (S121b and S121c), update the tertiary $A_0$ of the memory to a tertiary $A_1$ (S122b and S122c), and progress the metaverse or game based on the object synchronized by the tertiary $A_1$. The terminal devices 2a, 2b, and 2c assume that the locally stored primary copy and the locally stored tertiary copy indicate the latest state of the synchronization target object, and each of the terminal devices 2a, 2b, and 2c progresses the metaverse or game while independently performing user operation processing and physical simulation. As a result, in a case where each primary copy is changed, processing corresponding to S422a and S423a is executed, and the difference is repeatedly transmitted to the server device 1.

Note that, in the above operation, a case where the terminal device 2a that has the user ID "U001" and the ownership generates and changes the object $A_0$ has been described. However, deletion can also be performed. In a case where the object $A_0$ has been deleted, the server device 1 is notified of the deletion, and the server device 1 notifies the other terminal devices 2b and 2c of the deletion. In the above operation, a case where the terminal device 2a that has the user ID "U001" and the ownership generates only one object $A_0$ has been described. However, the number of objects generated by each of the terminal devices 2a, 2b, and 2c is not limited, and two or more objects may be generated, or no object may be generated.

In addition, the terminal device 2a suppresses the communication amount by not notifying the server device 1 in a case where there is no change in the object, but may also have a specification in which a notification of the communication amount is made also in a case where there is no change. In addition, in a case where there is a change in the object, the terminal device 2a transmits the difference information to suppress the communication amount. However, in a case where there is a change even in a part of the field, or in a case where there is no change, the terminal device 2a may have a specification in which a notification of the entire object including a field with no change is periodically made. In addition, these specifications may be statically or dynamically switched for each synchronization target object and a notification thereof may be made.

Next, a synchronization rule in a case where the object is updated will be described.

Figure 10:
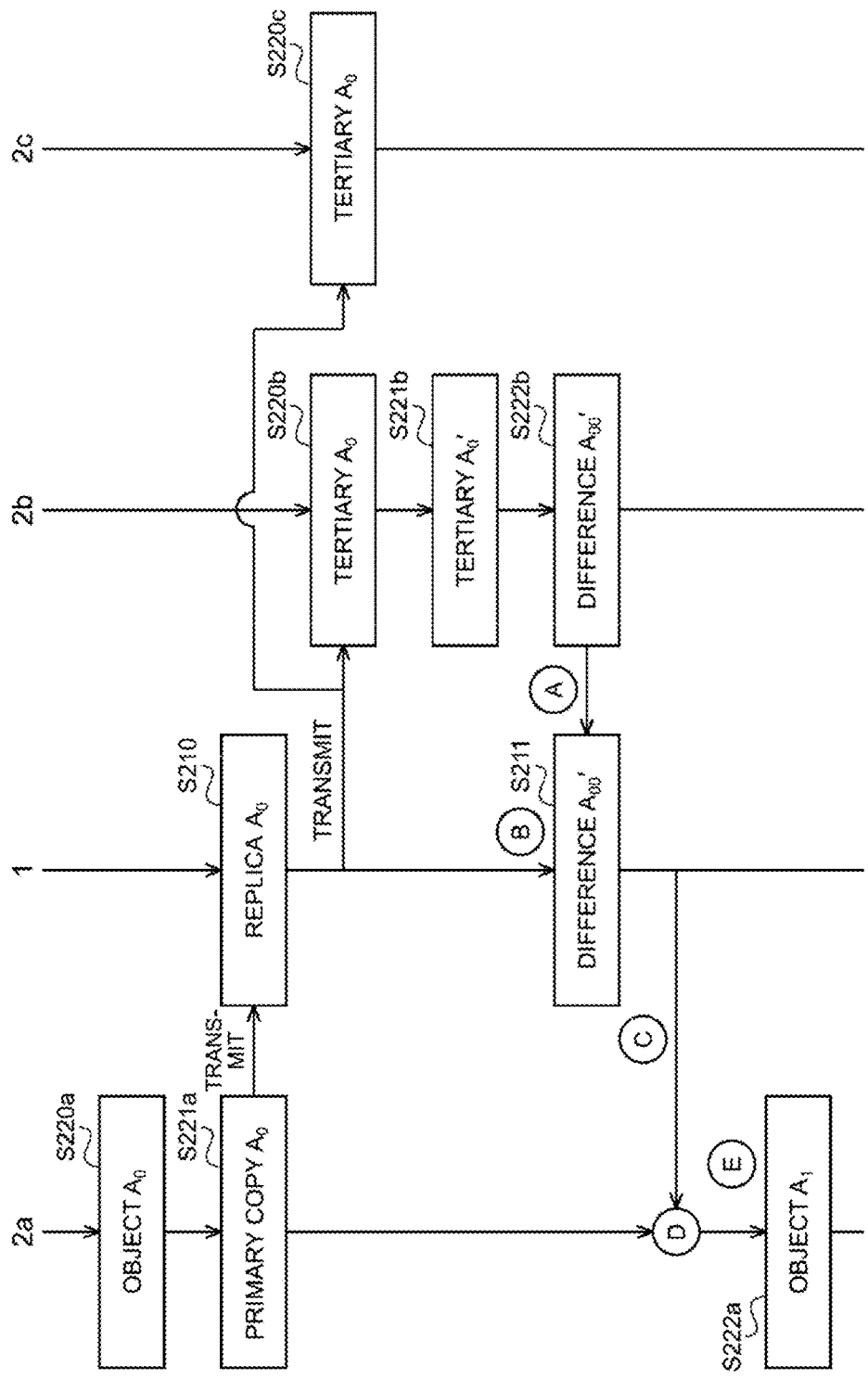
FIG. 10 is a flowchart for describing an example of a synchronization operation based on ownership.

FIG. 10 is a flowchart for describing an example of the synchronization operation based on ownership.

In a case where, in a state in which the object $A_0$ (S220a and S221a) of the terminal device 2a is replicated as the replica $A_0$ by the server device 1 (S210), and the replica $A_0$ is replicated as the tertiary $A_0$ from the server device 1 to the terminal devices 2b and 2c (S220b and S220c), the tertiary $A_0$ is updated with the progress of the metaverse or game in the terminal device 2b and is changed to a tertiary $A_0'$ (S221b), the ownership of the object $A_0$ that is the original of the tertiary $A_0$ is defined by the user of the terminal device 2a, and thus, the replica $A_0$ of the server device 1, the object $A_0$ of another terminal device 2a, and the tertiary $A_0$ of the terminal device 2c are not updated by a difference $A_{00}'$ (S222b) between the tertiary $A_0'$ updated by the terminal device 2b and the tertiary $A_0$.

As described above, the prohibition of synchronization by the tertiary $A_0$ is implemented by any of: (A) the terminal device 2b does not transmit the difference $A_{00}'$ between the tertiary $A_0$ and the tertiary $A_0'$ to the server device 1; (B) the server device 1 does not execute the synchronization processing even when the difference $A_{00}'$ is received (S211) (no update processing is executed for the replica and no transmission processing of update information is executed) (ignore and discard); (C) the server device 1 does not transmit the difference $A_{00}'$ to the terminal device 2a (and the terminal device 2c) without applying the difference $A_{00}'$ to its own replica $A_0$ and updating the difference $A_{00}'$; (D) the terminal device 2a does not receive the difference $A_{00}'$ (reception processing is not executed even if the difference is received, but the difference is ignored, discarded, or rejected); (E) or the terminal device 2a does not execute the synchronization processing even when the difference $A_{00}'$ is received (no update processing is executed for both of the primary copy and the tertiary). The prohibition of the synchronization based on the object update in a terminal device other than the terminal device of the user that has the ownership may be implemented by any method of A to E, or any combination of one or more of them. However, by adopting A of A to E, the amount of information transmitted and received through the network communication becomes the smallest, and the amount of information transmitted and received through the network communication increases in the order of B, C, D, and E. Therefore, the desirableness of the configuration increases from A to E. In addition, since server verification is usually performed in order to prevent fraud (cheat) in the game, a combination of A and B, or a combination of A, B, and E is a preferable minimum configuration.

(4) Intermediate Participation/Exit Operation

Next, a case where the terminal device 2a participates in the middle will be described. It is assumed that the terminal device 2b generates an object $B_0$, the user of the terminal device 2b has ownership of the object $B_0$, the terminal device 2c generates an object $C_0$, and the user of the terminal device 2c has ownership of the object $C_0$.

Figure 11:
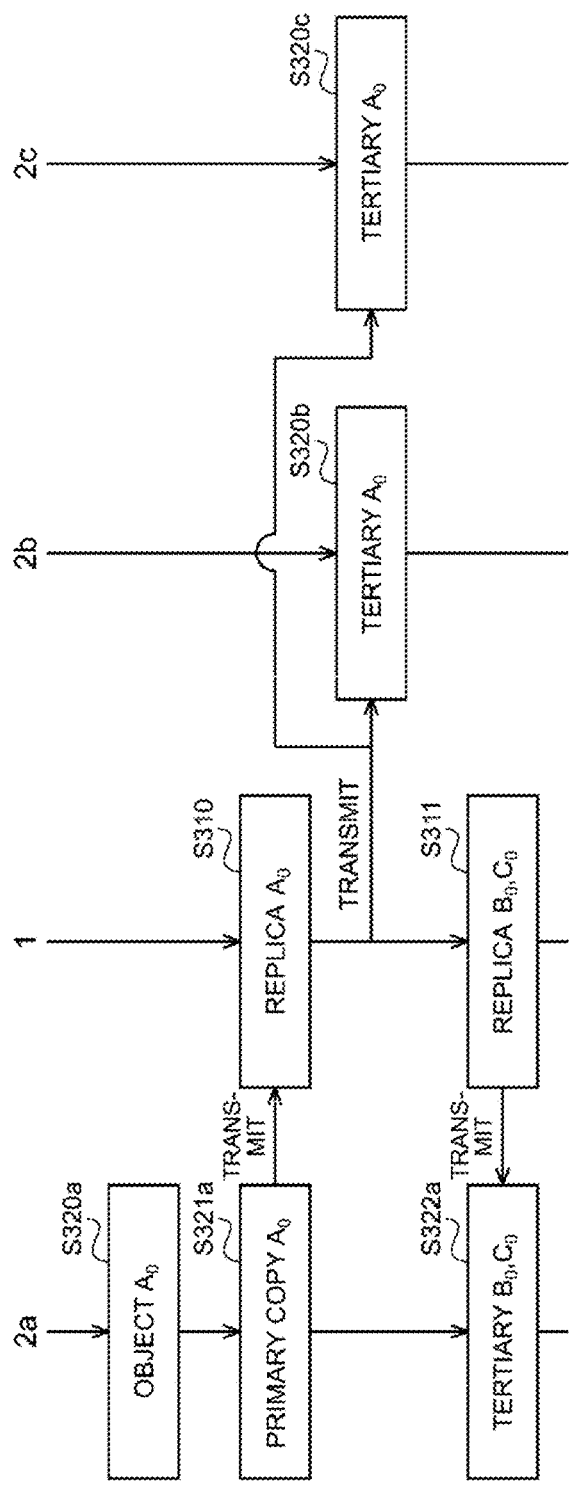
FIG. 11 is a flowchart for describing an example of a synchronization operation for intermediate participation.

FIG. 11 is a flowchart for describing an example of a synchronization operation for the intermediate participation.

First, the terminal device 2a first participates in the room. The server device 1 adds information of the user U001 associated with the terminal device 2a to the participant management information 113. Furthermore, the terminal device 2a participates in the middle and generates, for example, a new character as a new object $A_0$ (S320a). Next, the terminal device 2a generates a primary copy of the object $A_0$ (S321a) and transmits the primary copy to the server device 1.

The data reception means 104 of the server device 1 receives and replicates the primary copy of the object as data of a synchronization target from the terminal device 2a via the communication unit 13, and stores the replica $A_0$ in the memory 12 as a secondary copy (S310).

When the replica $A_0$ is generated, the replica management means 106 of the server device 1 records an owner "U001" of the replica $A_0$ (the user of the terminal device 2a), a transmission destination rule, "a user other than the owner of the terminal device 2a", and a policy of transfer permission, e.g., "permitted", updates the replica management information 114A or 114B, and stores the replica management information 114A or 114B in the storage unit 11.

Next, the data transmission means 105 of the server device 1 transmits the replica $A_0$ to the terminal devices 2b and 2c determined as the transmission destinations based on the replica management information 114A or 114B via the communication unit 14.

The terminal devices 2b and 2c receive and replicate the replica $A_0$ from the server device 1, and store a tertiary $A_0$ as the tertiary copy in the memory (S320b and S320c).

In addition, since the data transmission means 105 of the server device 1 manages the replicas of the objects owned by the users of the other terminal devices 2b and 2c in advance (S311), the data transmission means 105 transmits the replicas $B_0$ and $C_0$ to the terminal device 2a determined as a transmission destination based on the replica management information 114A or 114B via the communication unit 14. Note that the transmission may be performed before the synchronization operation of the object $A_0$.

The terminal device 2a receives and replicates the replicas $B_0$ and $C_0$ from the server device 1, and stores tertiaries $B_0$ and $C_0$ in the memory as tertiary copies (S322a). Through the series of operations, the terminal device 2a communicates only with the server device 1 without communicating with the terminal devices 2b and 2c, and the participation operation is completed. Here, the number of already participating terminals is two, but even in a case where 1000 terminals already participate, the participation of the terminal device 2a can be completed by communicating only with the server device 1, and the 1000 already participating terminals do not need to notify the terminal device 2a of the synchronization target objects owned by the terminals, and the loads of the network and each terminal device due to the participation of the terminal device 2a in the middle are small.

Next, a case where the terminal device 2a exits in the middle will be described. Here, regarding the persistence of an object whose ownership is held by the terminal device 2a and the transfer of the ownership, a case where the object persists and a case where the object is erased will be described. Although not illustrated, in the area information synchronization processing, when the owner of the area participates (returns) in one of the rooms of the area, the same method is applied to a case where the ownership of the object of each area information is transferred to the owner of the area. In this case, exit of the terminal device 2a holding the ownership does not trigger, but the participation of the owner terminal of the area in the room of the area triggers the server device 1 to instruct the terminal device 2a to discard the object to which the ownership is transferred/owned, and performs the operation similar to that in FIGS. 12 and 13.

Figure 12:
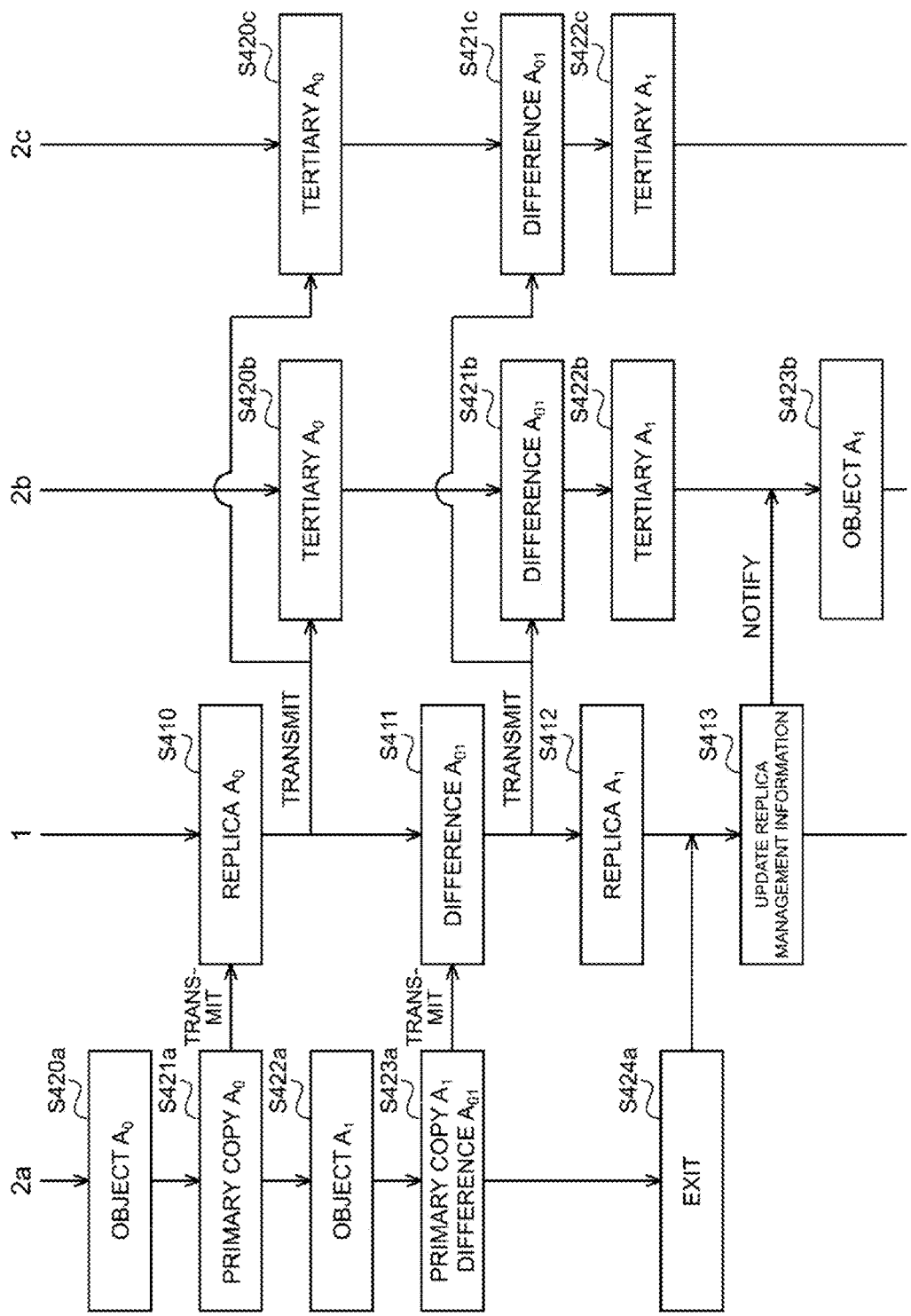
FIG. 12 is a flowchart for describing an example of a synchronization operation for intermediate exit.

FIG. 12 is a flowchart for describing an example of a synchronization operation for intermediate exit.

It is assumed that the terminal device 2a generates an object $A_0$ (S420a), updates the object $A_0$ to be an object $A_1$ (S422a), and exits after tertiaries $A_0$ and $A_1$ are synchronized with the terminal devices 2b and 2c, respectively (S422b and S422c) (S424a). First, as illustrated in FIG. 4, a case where a transfer item of a replica ID "A" of the replica management information 114A or 114B indicates "permitted" will be described. Here, examples of the object for which the transfer item indicates "permitted" include items used in a game, and the like, and may further include a character (non playing character (NPC)) or an enemy.

The terminal device 2a makes an exit request to the server device 1. The participant management means 103 of the server device 1 deletes user information associated with the terminal device 2a from the participant management information 113. Furthermore, the replica management means 106 of the server device 1 checks the transfer item of the replica management information 114A or 114B, and in a case where the transfer item indicates "permitted", the replica management means 106 changes the owner to the user of the terminal device 2b, updates the content of the replica management information 114A or 114B (S413), and notifies the terminal device 2b of the fact that the ownership has been changed.

When the terminal device 2b receives, from the server device 1, a notification indicating that the ownership has been changed to the terminal device 2b, the terminal device 2b changes the stored tertiary $A_1$ to the object $A_1$ owned by the terminal device 2b (S423b), whereby the exit operation is completed. Here, the terminal device 2a explicitly notifies the server device 1 of the exit (S424a), but a notification of the exit cannot be made due to sudden disconnection or the like in some cases. Even in this case, in a case where the terminal device 2a detects disconnection (for example, the socket is closed), the server device 1 can complete the processing of exiting and changing the ownership similarly to the case where the exit notification is explicitly received. In a case where the owner of the tertiary is strictly managed in each terminal device, although not illustrated, the server device 1 transfers the ownership, and notifies all the remaining terminal devices (in this case, the terminal device 2c) participating in the synchronization operation other than the terminal device 2b that manages the tertiary as the primary thereafter that the ownership of the object A (tertiary A) is transferred from the terminal device 2a to the terminal device 2b. In a case where each terminal device manages only whether the synchronization target object managed by its own terminal device is the primary owned by its own terminal device or the tertiary not owned by its own terminal device (in a case where the terminal device does not manage the owner of the tertiary), notification is not necessary to the terminal device (2c) that does not have the ownership of the object. However, in this case, the server device 1 should transmit the update information to the terminal device that does not have the ownership only when the terminal device that has the ownership has received the change information that has changed the primary, and should not transmit the update information to the terminal device that does not have the ownership when the terminal device that does not have the ownership has received the change information that has changed the tertiary. In the former, the terminal device strictly manages the owner of the tertiary, and it becomes easy to cope with abnormal update information such as a cheat, but the communication amount accompanying the intermediate exit increases. In the latter case, abnormal update information such as a cheat depends on the response in the server device 1, but the communication amount is extremely small as the user exits in the middle, and this is effective when an enormous number of terminals participate in the synchronization operation. The former and the latter may be individually selected depending on the type of the object to be synchronized and the performance of the terminal device.

Note that, in a case where the transfer item indicates "permitted", a transfer target user may be determined in advance or may be determined at the time of exit. Alternatively, the transfer may be performed in order of date and time of participation, the transfer target user may be randomly determined, a user of a terminal with a high processing capability may be allocated as the transfer target user, or a user of a terminal with a good network environment (high bandwidth, low latency/round-trip time (RTT), stable communication (RTT is stable and small)) may be allocated as the transfer target user.

Next, a case where the transfer item of the replica ID "A" of the replica management information 114A or 114B indicates "not permitted" will be described. Here, examples of the object for which the transfer item indicates "not permitted" include a character (user's own avatar) played in the game and an enemy, and may further include an item used in the game.

Figure 13:
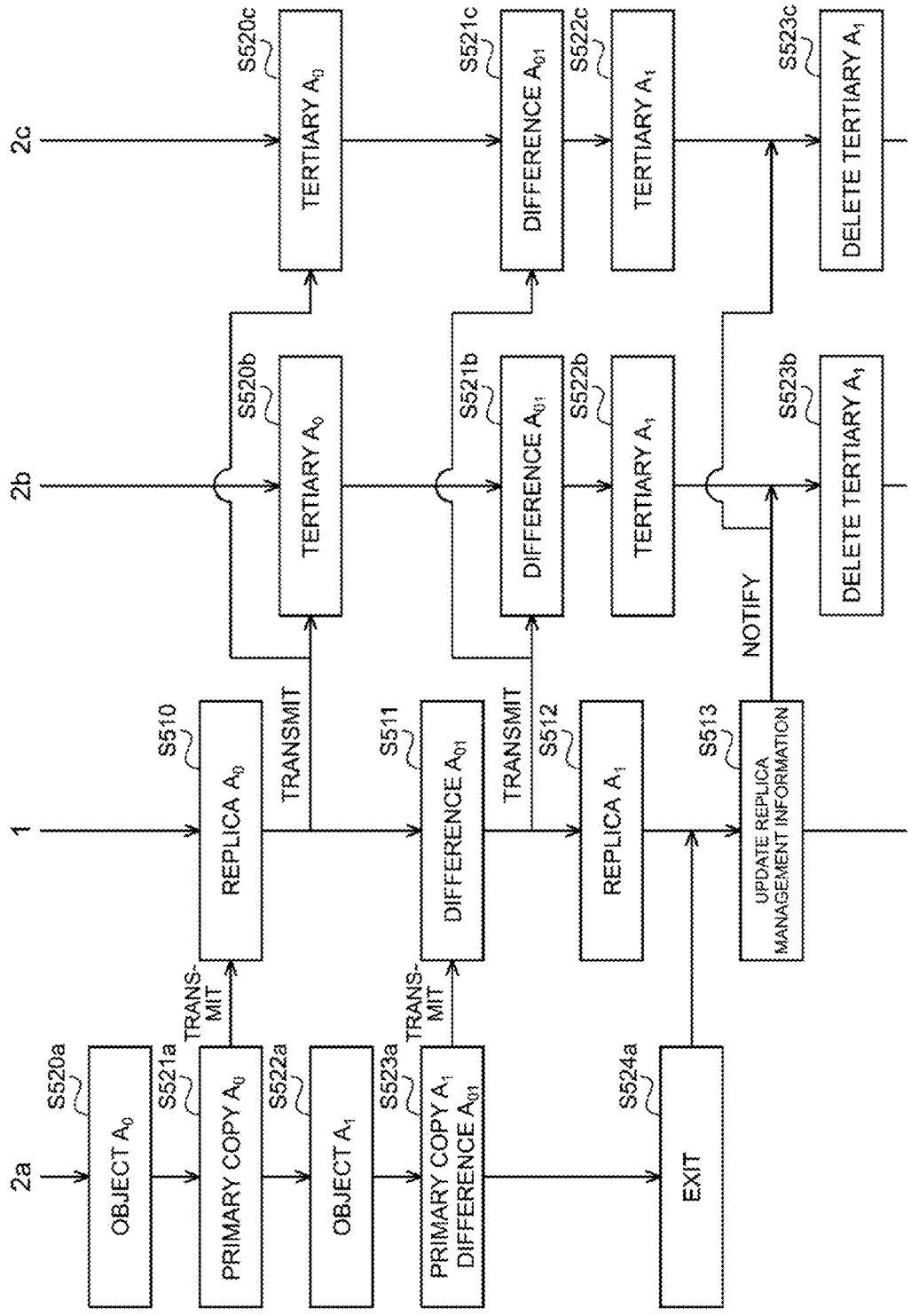
FIG. 13 is a flowchart for describing another example of the synchronization operation for the intermediate exit.

FIG. 13 is a flowchart for describing another example of the synchronization operation for the intermediate exit.

The terminal device 2a makes a request for exit (S524a) to the server device 1. The server device 1 checks the transfer item of the replica management information 114A or 114B, and in a case where the transfer item indicates "not permitted", the server device 1 deletes information regarding the replica $A_1$, updates the contents of the participant management information 113 and the replica management information 114A or 114B (deletes the user information associated with the terminal device 2a and delete the synchronization target object owned by the user associated with the terminal device 2a) (S513), and notifies the terminal devices 2b and 2c that the replica $A_1$ has been deleted.

Upon receiving the notification that the replica $A_1$ has been deleted from the server device 1, the terminal devices 2b and 2c delete the stored tertiary $A_1$ (S523b and S523c), whereby the exit operation is completed.

Figure 14:
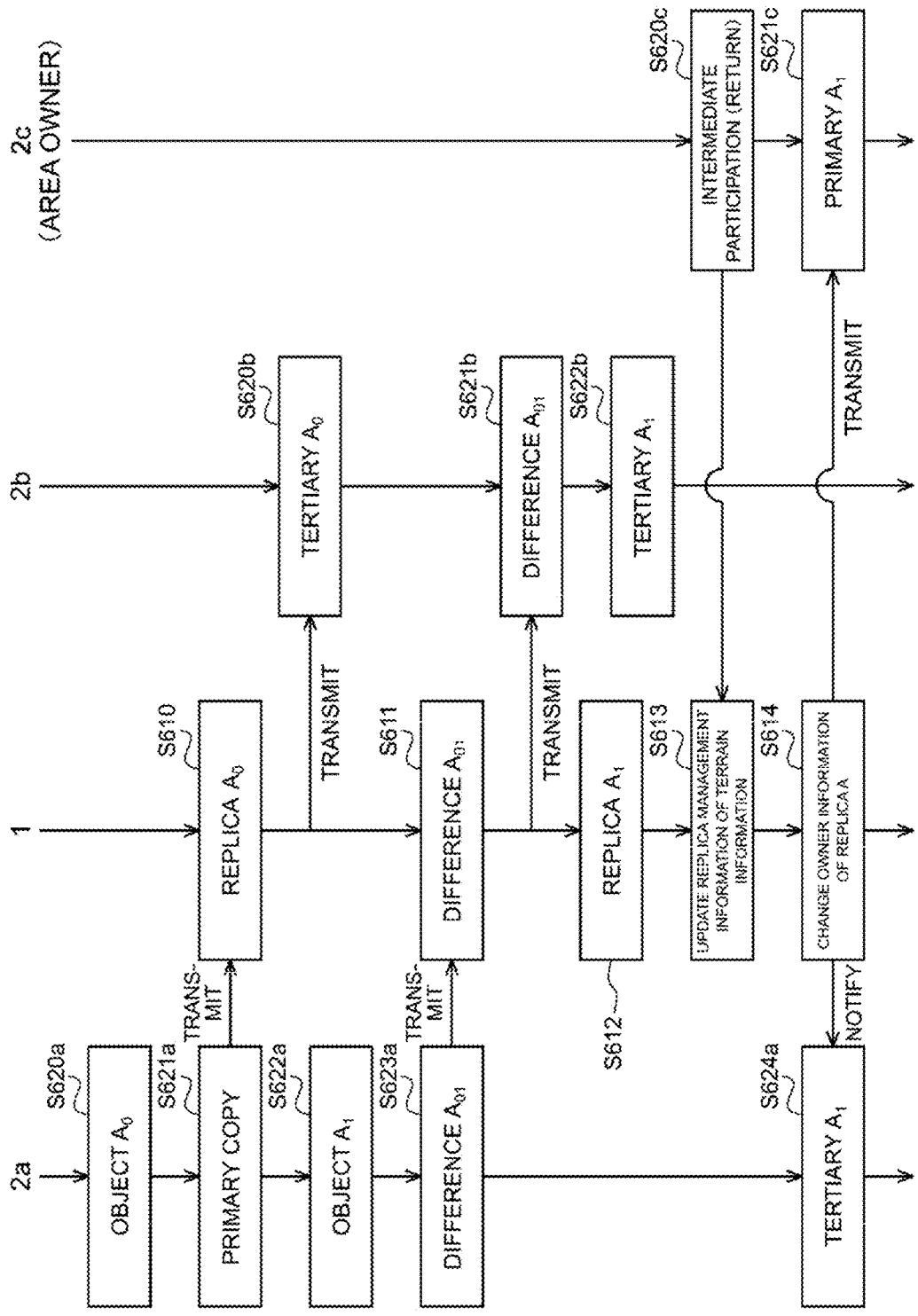
FIG. 14 is a flowchart for describing an example of a synchronization operation for intermediate participation by an area owner.
Figure 15:
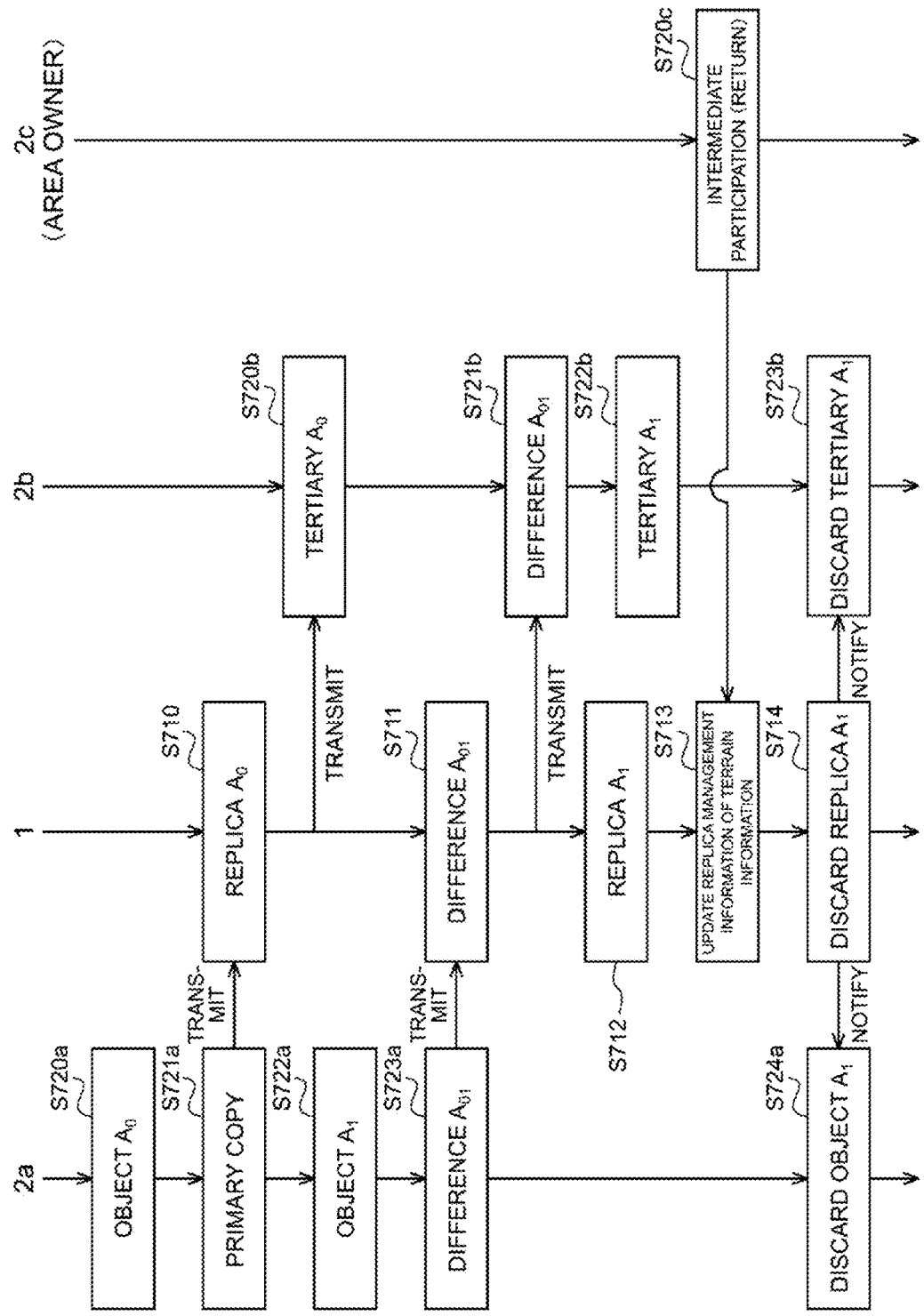
FIG. 15 is a flowchart for describing another example of a synchronization operation for intermediate participation by an area owner.

FIGS. 14 and 15 are flowcharts for describing an example of a case where the area owner (user that has the right to edit area information) 2c recovers the ownership of the synchronization target object of the area information in a case where the area owner 2c participates (returns) in any room of the area in the middle (S620c, S720c).

In the case of the transfer target object in the replica management information 114A, as illustrated in FIG. 14, the ownership of the object is transferred from the terminal device 2a to the terminal device 2c of the area owner in substantially the same procedure as in FIG. 12, the primary in the terminal device 2a becomes tertiary (for example, the server device 1 notifies the terminal device 2a of the loss of the ownership due to the transfer of the ownership) (S624a), and the terminal device 2c holds the primary (S621c) (for example, the server device 1 transmits the replica to the terminal device 2c and further notifies acquisition of the ownership by transfer of ownership (S614), resulting in that, the terminal device 2a holds the primary as the tertiary, and the terminal device 2c receives the replica and holds the replica as the primary). Although not illustrated, the terminal device 2b is also notified of the change of the owner if necessary for the reason that the owner of the tertiary is also managed by the terminal. In the case of the non-transfer target object in the replica management information 114A, as illustrated in FIG. 15, the replica of the object is discarded (S714), and the corresponding primary and tertiary for the participants participating in all the rooms of the area are also discarded (S724a, S723b) in a procedure substantially similar to that in FIG. 13.

Effects of Embodiment

According to the above-described embodiment, since the terminal device 2a does not receive synchronization target objects from all the other terminal devices 2b and 2c, the server device 1 stores replicas of objects generated by all the terminal devices, and the terminal device 2a receives a synchronization target object from the server device 1, it is possible to suppress an increase in communication load in a configuration in which a plurality of terminal devices participate and data of a plurality of terminal devices are synchronized. In addition, since the server device 1 does not progress the metaverse or game, the processing load can be reduced. As a result, object synchronization for a metaverse or game in which about 1000 participants participate becomes possible.

In addition, since it is sufficient if a replica is received from the server and a tertiary is created for the intermediate participation, there is no need to receive an object from another client, and an increase in communication load and processing load can be suppressed.

In addition, in a case where there are a lot of pieces of terrain information 111 (areas) similar to a metaverse, which terrain information 111 to participate in is designated by the URL. Therefore, it is possible to participate in the room to which the terrain information 111 belongs (participate in the designated area) without being conscious of the room, and it is easy to notify other users and to share. In particular, in a case where the program such as a metaverse or MMOG operates on a web browser, the URL can be embedded on a web page to participate from the web browser.

Furthermore, since the editing of the terrain information 111 is similarly performed via the web browser by the URL, it is not necessary to install an application for editing in the terminal devices 2a, 2b, and 2c, and the process for starting editing can be reduced.

In addition, since it is only necessary to refer to only the received information of the synchronization target object in the management information, and it is not necessary to refer to the authority list until the corresponding user is found, there is an effect that the processing load is reduced.

In the above embodiment, even if the number of users is smaller than 1000 (for example, 100 people or 10 people), the processing load is $\frac{1}{10}$ and $\frac{1}{100}$ as compared with the case of 1000 users. Therefore, the processing load can be reduced as compared with the conventional method, and the service using the embodiments can be provided to the user at low cost.

For example, regarding an object such as a ball of a soccer game, in a case where the ownership of the ball is defined to the player holding the ball, the ownership of the object of the ball changes in the progress of the game. However, if the ownership is managed for each object, the management information can be updated only once, and it is not necessary to confirm and update the authority lists of a plurality of users, so that the processing load and the communication load are reduced.

It is a further object of the embodiments to provide a server capable of executing a synchronization operation in a multi-player game regardless of the design of the game.

For example, the embodiments have a configuration that can sufficiently withstand a design in which the ownership of the synchronization target object changes rapidly by a large number of people and a design in which the number of the ownership of the synchronization target object is large, and can provide an environment that is able to cope with a game having an unknown design that cannot be currently anticipated.

Another Embodiment

The present invention is not limited to the above embodiment, and various modifications can be made without departing from the gist of the present invention.

Note that, in the above-described embodiment, since the object updated by the user that has the ownership updates the replica in the server device 1 and the update information is propagated to the remaining clients in the same room, conflict resolution in the progress of the metaverse or game is conflict resolution prioritized for the owner client, but equality for the avatar in the metaverse or game can be realized as long as it is a metaverse or game design owned by each client itself. The conflict between the owner clients is resolved by the design of the metaverse or game. For example, it is preferable to make a design that does not involve direct correlation, or make a design in such a way that synchronization target objects have a correlation via another mechanism such as a remote procedure call (RPC) or another object to prevent involving direct correlation.

In addition, since the ownership of the synchronization object related to the area information is defined for each area, when there are a plurality of rooms in the area, the ownership is applied to all the rooms in the same area and is shared. That is, when the client that has the ownership updates the state of the synchronization target object of the area, the client updates not only the area information of the participation room but also the room belonging to the same area in which the client does not participate. Since the area information is not strictly an object dedicated to a specific client, there may be a case where a client that does not have ownership of an area desires to perform an update. In order to perform the update, the client that does not have ownership of the area make a request for update to the client that has the ownership (primary) of the synchronization target object. As one example of the request method, a program (script) such as RPC is used. Such an operation involving a change of an object without ownership, for example, opening and closing of a door of a building, is operated as a program of the synchronization target object (in this case, a door), and when the program is operated, the operation is similarly executed in all clients that perform synchronization operation of the object, and the operation in the client that does not have the ownerships fails, but the operation in the client that has the ownership succeeds, and the state of the object change (for example, the closed door is opened) occurs in the primary copy for the client that has the ownership. This change is reflected in the replica in the server device 1 by the synchronization mechanism of the state change of the object, and is subsequently reflected in the tertiary for each remaining client that does not have ownership participating in each room in the same area. With this mechanism, the client can also realize operation of an object that does not have ownership. Although an example of the synchronization of the area information in the area across the room has been described, the synchronization method by the same program/script such as RPC is not limited to the area, and can also be performed on an object of another person that does not have ownership in the room. However, in this system, when a plurality of clients attempt to operate the same object at the same time, a large number of requests of a plurality of similar RPCs occur. However, the order of execution varies depending on the client, including delay of communication or the like and coincidences, and only the operation of the RPC of only one client in the terminal that has the ownership is effective. Therefore, the client that has the ownership is overwhelmingly advantageous, and between the clients that does not have ownership, the distance between the client that does not have ownership and the client that has the ownership, the CPU performance of the client, the network environment to which the client is connected, and the like are relied on. Therefore, it cannot be said that it is fair to use it as a synchronization operation in a time-critical operation such as FPS, but it is sufficient for contents such as social content in which changing occurs at a low frequency. As described above, the selection of the synchronization target object, the range of synchronization (whether the entire area or in the room), the method of synchronization (whether direct object synchronization or indirect synchronization via a program such as RPC), and the like greatly affect the function and performance of the service to be provided, and thus should be determined according to the design of the service (game design) to be realized.

In addition, in the above-described embodiment, since the existing technology can be applied to the method of progressing the metaverse or game while performing synchronization between clients, the details are omitted. In particular, in a virtual environment in which a large number of people from all over the world participate, there is a possibility that a delay or a loss occurs in transmission of information regarding the synchronization target object. Therefore, for transmission of the information, it is necessary to devise various general methods in addition to the method proposed by the present embodiment in accordance with the type of the virtual space (the genre of metaverse or game) and the type of the synchronization target object.

First, in order to deal with the network delay, each client often synchronizes a virtual space time in a virtual space in which the client participates, and attaches the virtual space time to communication information regarding the synchronization target object.

In order to deal with the network delay, a synchronization method that causes a shift in the progress of the metaverse or game for each client participating in the virtual space is widely used. That is, the terminal devices 2a, 2b, and 2c progress the game independently in the virtual space, but times in the virtual space in which the terminal devices 2a, 2b, and 2c are progressing the game do not slightly coincide with each other. In a case where the terminal device 2a and the terminal device 2b can be viewed side by side, the virtual space time of the terminal device 2a is slightly delayed with respect to the virtual space time of the terminal device 2b (after a certain event occurs in the terminal device 2b, the event also occurs in the terminal device 2a). This is particularly noticeable when the terminal device 2a and the terminal device 2b are installed geographically away from each other, and when there is a large difference in distance between each of the terminal device 2a and the terminal device 2b and the server device 1 (for example, a case where the server device 1, the terminal device 2a, and the terminal device 2b exist in Tokyo, Osaka, and New York, respectively).

In addition, retransmission may be performed according to a communication protocol in order to deal with a network loss. The retransmission further delays transmission of information regarding the synchronization target object.

Furthermore, in order to reduce the transmission frequency of the information regarding the synchronization target object, not only the processing based on the threshold described above but also the transmission frequency is widely limited. In a case where the progress of the metaverse or game in the virtual space is managed by a frame (sampling the state of a metaverse or game at appropriate time intervals and synchronizing at the frequency of sampling), the primary copy is updated at a frame rate (for example, 20 times per second). It may be combined with update control using a threshold. The frame management means that each terminal device performs synchronization at each frame time common to the virtual space. More specifically, the primary copy is updated (a condition such as a threshold is also considered as necessary) in each client for each specific common virtual space time in the virtual space, and a frame time of the frame (the virtual space time or a serial number of the frame) is attached at the update timing and transmitted to the server device 1 as update information (a difference or all). Meanwhile, each terminal device receives the update information of the primary copy of another terminal together with the frame time at the time of each update. The frame time attached to the update information of another terminal received by the terminal device coincides with a frame time of the latest primary copy in a state where there is no delay. In a state where there is a delay, the frame time attached to the update information received by the terminal device varies depending on the terminal device that owns each object due to various reasons such as a location of the terminal device, a network environment, or a temporary change in a communication state, and is generally earlier than the frame time of the primary copy of the terminal itself. When the metaverse or game is simply progressed based on the primary copy and the tertiary copy at different frame times, the synchronization deviation between the terminals may increase. In such a case, for example, it is also possible to first measure a difference in frame time received from each terminal in advance and progress the metaverse or game in accordance with the frame time of the terminal that transmits the latest frame time on average. In that case, update information for several frames is buffered by the terminal device, and those at the same frame time are combined to strictly progress the metaverse or game. However, when the lag is 0.1 seconds or more (a delay of two frames or more in a case of 20 frames per second), the user experience is deteriorated depending on the genre of metaverse or game. Although further details are omitted, a method adapted to the genre of metaverse or game is adopted using various compromise plans. In a mobile terminal or the like, a delay of a frame dynamically changes greatly, and thus, another measure is also required.

Alternatively, the virtual space time information in the virtual space may be attached according to a characteristic of a communication path. In a case where a reliable communication protocol such as TCP/IP or reliable UDP (RUDP) is used, a virtual space time order of received update information of a shared object is not changed. On the other hand, in a case where the entire synchronization target object is transmitted every time and, under the assumption of occurrence of communication loss, the entire synchronization target object is transmitted as the update information using a protocol such as UDP that does not guarantee reliability, the arrived update information is partially lost or arrival of the update information is not in the order of virtual space time attached to the primary copy, for example, back and forth in order in some cases. In such a case, the terminal device progress the metaverse or game by synchronizing the object by replacing the received information using the virtual space time attached to the update information or discarding unnecessary old information when old update information is received.

Furthermore, the participant management information 113 may manage links to the participant objects as a list in the order of participation. The server device 1 may perform communication with the terminal devices 2a, 2b, and 2c by acquiring information necessary for corresponding communication from the participant information of each link.

In the above embodiment, the functions of the means 100 to 104 of the control unit 10 are implemented by the program, but all or a part of the means may be implemented by hardware such as an ASIC. In addition, the program employed in the above embodiment can be provided in a state of being stored in a recording medium such as a CD-ROM. Furthermore, replacement, deletion, addition, and the like of the steps described in the above embodiment can be made within such a scope that the gist of the above-described embodiment is not changed. In addition, the function of each means may be appropriately coupled to another means or may be separated into a plurality of means.

Another Embodiment 2

Groups of terminal devices synchronized with each other can be flexibly specified. In the embodiment and another embodiment, the description has been given of the synchronization operation of the area information of the area and the synchronization operation of the non-area information of the room, but the group of terminal devices synchronized with each other (hereinafter also simply referred to as a "synchronization group") is not limited to the area (the participant terminals of all the rooms in the area) or the room (the participant terminal of the room). Here, one or more (in FIG. 8, 114B is one) synchronization groups of rooms are configured in units of rooms from clients configured to synchronize user information among the synchronization target objects with each other, and one or more (in FIG. 7, 114A is one) synchronization groups of areas are configured in units of areas from clients configured to synchronize terrain information (areas) for reproducing a content constituting a virtual space among the synchronization target objects. In addition, each synchronization group may be dynamically generated, changed, and disappeared as described in the case of the room as an example. The management of the group is managed and maintained as each group management information similarly to the room management information and the terrain management information. The terminal device can participate in or exit one or a plurality of groups as appropriate according to the policy of each group. For example, in a case where a certain area is designated to experience a virtual experience, the user participates in a synchronization group of the area and a synchronization group of the room, and when exiting the room, the user also exits from the synchronization group of the area and the synchronization group of the room.

As another embodiment 2, a configuration method of a more general-purpose synchronization operation will be described. Here, a synchronization target object and a terminal device group (synchronization group) for a synchronization operation including terminal devices participating in the synchronization operation of the object are the basis of the synchronization operation. Based on a method of configuring an object to be synchronized or a method of configuring a terminal device configured to perform the synchronization operation, it is possible to cope with various synchronization usage forms and to improve efficiency of the synchronization operation.

(1) Basic Synchronization Operation

The synchronization operation of objects is realized as follows: the owner terminal and the terminal that does not have ownership but is configured to perform synchronization operation of a target object are connected to and communicate with the server device 1 for each synchronization object. In this case, the terminal devices configured to perform synchronization operation form a synchronization group. The terminal device group (synchronization group) is all or some of the terminal devices connected to the server device 1 in order to participate in the virtual space.

The synchronization operation in the synchronization group for each synchronization target object is as described in FIGS. 9 to 13. The terminal device of the participant that owns the object holds the primary of the object, the server device 1 holds the replica of the object, and the terminal device of each remaining participant in the synchronization group that does not have the ownership of the object holds the tertiary of the object. The change information in the primary is sequentially applied to the replica and the tertiary, so that the primary, the replica, and the tertiary are synchronized to the same state. The terminal device of the participant that does not have the ownership should not directly change the tertiary, and even if the tertiary is changed, the replica, the primary, or the tertiary in another terminal is not changed. When the terminal device of the participant that does not have the ownership but demands to change the tertiary requests the terminal device of the participant that has the ownership to change the primary without directly changing the tertiary, and if the terminal device of the participant that has the ownership updates the primary according to the request, the update information propagates to the replica and the tertiary, and as a result, the tertiary in the own terminal is also changed.

A replica management device manages and operates the synchronization operation for each synchronization target object. As illustrated in FIGS. 7 and 8, the server device 1 holds a replica ID, a terminal device group (synchronization group) (owner, non-owner participant, if necessary, transmission destination limiting rule) for a synchronization operation, information regarding transfer, and the like for each replica to be synchronized. Note that FIGS. 7 and 8 correspond to a case where the respective area participant and room participant configure the terminal device group for the synchronization operation, and the participant that does not have ownership is a participant obtained by excluding the owner from the participant list. In FIGS. 7 and 8, a plurality of synchronization target objects that have the same configuration terminal device of the synchronization group are collectively managed in units of areas or rooms. However, a similar synchronization operation is performed even if the synchronization target objects are individually managed. However, it is advantageous to collectively manage the synchronization target objects that have the same configuration terminal devices of the synchronization group as illustrated in FIGS. 7 and 8 because the number of active synchronization groups can be reduced.

(2) Configuration of Synchronization Target Object

The object to be synchronized may be an object recognized as an object in the virtual space, but it is desirable to reduce the load of the synchronization operation by reducing the number and contents of objects to be actually subjected to the synchronizing operation by limiting to parameters of the object such as a position and a posture necessary for reproducing the synchronized state of the object, not the object itself (for example, a part of a field of the object or those encoded), or by grouping a plurality of objects exhibiting similar behavior as a combined object.

In the metaverse or the MMOG, with respect to an object corresponding to an avatar, an accessory (clothes or equipment) of the avatar, content of experience (building, terrain), or the like, a state in which each state changes with user's operation or passage of time, and changes of each object are shared (synchronized) among other participants who experience the same content, thereby sharing a virtual experience. Examples of objects to be synchronized include an avatar, clothes, a building window, a door, and the like. However, when individual objects are separately synchronized, the number of objects becomes enormous, and a burden (number, size, communication amount, and the like) of management work as a replica increases. As one method of reducing the burden of the number of synchronization target objects, it is designed to synchronize only some of the parameters constituting the objects for each object to be synchronized. That is, even if the avatars are synchronized, it is sufficient that only the parameter information such as the position and posture is synchronized without performing the synchronization operation on the unchanged shape and details of the avatar. Furthermore, in a case where a plurality of objects to be subjected to the synchronization operation behave in a semantically similar manner, it is preferable to create and manage a single synchronization target object including only parameters to be synchronized (encoding such as combined compression is further performed as necessary) among the parameters of the plurality of objects, and perform the synchronization operation on the synchronization target object. For example, the avatar body and the avatar appendage are preferred not to be managed as separate synchronization target objects, but are preferred to be subjected to the synchronization operation as special synchronization target objects, for which the parameters are managed with the avatar body and the avatar appendage regarded as a group of objects bundled together. For the avatar of the user or the appendage of the avatar, as the non-area information, and for the information regarding the state or shape of the building or the ground surface of the area, as the area information, only the parameters for managing the respective states may be collected for each user (avatar) and each area, and the replica management information (replica management information 114b of the room when the synchronization group is the room, and replica management information 114a of the area when the synchronization group area is the synchronization group area) may manage the collected parameters as a single (or a small number of) special synchronization target object, and the special synchronization target object may be set as a target of the synchronization operation of the individual non-area information or the area information.

Furthermore, in designing a synchronization target object, a method of synchronization also needs to be carefully considered, for example, whether a field (value, parameter) of the object is synchronized (synchronized as an object) or synchronized as an event (trigger) of a program operation. Values and parameters are synchronized as objects as described above, but an event is not a value of an object, and a message serving as a trigger is sent to a synchronization group including the own terminal device. If the trigger is executed (RPC, Remote Procedure Call) by a program (script) of each terminal device almost simultaneously and almost similarly, almost similar experience is shared as an execution result of the client program in each terminal. Here, almost simultaneously and almost similar means that there is a case where execution results are not necessarily completely the same due to a deviation in execution between terminals or a slight deviation in an internal state of a terminal.

For example, a complex animation such as a jump of an avatar is executed independently in each terminal device in synchronization with the execution of an event reception such as an animation playback process such as a jump, rather than a one-by-one synchronization operation trigger of a parameter change of a position or a posture. If the environment of the virtual space before execution of the program, which is the initial value, is substantially the same in all the terminal devices, substantially the same animation is executed, and experience sharing in the virtual space can be substantially realized. In a case where the result of the program affects the position and posture of the object, the mechanism of the synchronization operation of the object is used according to the execution result of the program, and the execution result of the program in the terminal device that has the ownership of the object to be changed is the change of the primary, and the replica and the tertiary are updated as the reflection of the result. In the execution of the program in the terminal device that does not have ownership, the tertiary is not directly changed, but the primary is changed by the execution of the similar program in the terminal device that has the ownership. Therefore, the change is reflected as the replica and the tertiary, and as a result, the tertiary is also changed.

For example, as an example of the area information, in a case where a terminal device that does not have ownership of a door executes a program for opening and closing a door, a program result of an opening and closing operation of the door in the terminal device fails and does not affect the door, but the same program is also executed in the terminal device that has the ownership of the door, and the primary corresponding to the door is updated as an execution result of the program. The update of the primary is further spread to the replica and the tertiary, and the tertiary is changed even in the terminal device that tries to perform the door opening/closing operation, and as a result, the result of the door opening/closing operation is reflected. Although not described in detail, such a program (script) itself is not a synchronization target, but is a part of each piece of non-area information and area information, and is loaded on the client terminal as a part of non-asynchronization target information of the non-area information and the area information when the corresponding user and terrain are expressed in the virtual space.

It is effective to selectively use a synchronization method based on a parameter value of an object and a synchronization method based on an execution result (RPC) of a program depending on a property and a function of the object to be realized. The basic operation of the object synchronization method of the present embodiments is disclosed. Furthermore, for the program synchronization (RPC), an existing RPC mechanism (in addition, various approaches are known, such as a combination of simple messaging and message handler) is utilized, and the object synchronization method updated as the execution result of the program is also disclosed by combining the basic synchronization operation and the RPC mechanism. In the present embodiments, the synchronization (RPC) itself of the program (script) will not be described in detail. However, in a case where the synchronization operation of the present embodiments is applied together with the synchronization method by the RPC, if there is a change in the object owned by the user itself as a result of the program started by another user that does not have ownership, in many cases, it is preferable to verify effectiveness and validity of the execution of the program for the owned object. In addition to the confirmation of the operation authority, it is also possible to perform exclusive control or the like in a case where a plurality of terminals simultaneously intend to operate a single object.

Similarly, for a single synchronization target object in a synchronization group, when a plurality of clients have ownership, it is necessary to use a synchronization method based on an execution result of a program in order to synchronize respective primaries.

The area information and the non-area information are content in the virtual space, and may be created, edited, or deleted by a method different from an operation (game operation) in the virtual space. A unique ID is designated for these contents, and if a URL or the like can be designated as one of the unique IDs, convenience is enhanced.

For example, user registration is often performed to participate in the virtual space. At that time, non-area information (content) such as a name and an avatar in the virtual space is created and edited.

Furthermore, in a case where new user experience content (area) or the like is additionally created in the virtual space, a name and area information is created and edited for a space for providing the user experience in the new virtual space.

Such various content editing operations are performed using a 3D editor or the like. Since the content of the area information or the non-area information can be referred to by the URL, the content can be directly edited By the direct 3D editor. The immediacy and convenience are improved as compared with a method in which the content is downloaded or uploaded for each configuration object and edited with the 3D editor.

In the 3D editor, basic units such as points and lines may be combined to create, combine, and arrange a detailed object, basic objects such as a ground, a house, and a mountain provided by the editor may be arranged, and characteristics and attributes (setting the ground as lawn, concrete, or specifying the height, size, and floor number of the house) thereof may be customized, or objects such as a desk, a bench, and a star may be arranged and customized in a space of a template such as a living room, a showroom, a park, or the universe.

In the metaverse or the MMGO, a function of creating and editing non-area and the area information is often provided as a part of a function of a virtual space application, or data created by a general-purpose 3D editing application is uploaded and registered in the virtual space. However, in the present embodiments, as described above, the non-area and the area information are managed by the server in principle. The program is downloaded as necessary when the program is executed in the terminal device. In the case of a configuration that performs a synchronization operation (primary, replica, tertiary) of synchronization target information, by providing a mechanism that can directly designate content such as non-area and the area information existing in a server, various types of content can be easily shared between users or between a plurality of terminals of the same user. In the present embodiments, it is possible to more generally define a URL or the like instead of expression inside an application such as a terrain ID or a character ID. For example, by using a method such as URL scheme, deep link, or Universal Links and adjusting a parameter according to a target content or an access method, it is possible to directly edit the target content or access the target content in a desired mode (program) such as participation in the content without taking a detour. In addition, by being able to access with a general-purpose URL, each content can be mutually used and reused not only in the present service but also in a more open environment.

For example, in a case of participating in a certain area A100, "https://sample.metaverse.jp/?area_id=A100&action=join", for example, in a case of participating in a specific room R101 existing in a certain area A100, "https://sample.metaverse.jp/?area_id=A100&room id=R101" or "https://sample.metaverse.jp/?area_id=A100&room id=R101&act ion=join", the management site sample.metavers.jp, the area ID A100, and the room ID R101 and the access mode join (participate) may be designated as necessary.

In addition, in a case where the area information of a certain area A101 is edited, the management site sample.metavers.jp, the area ID A100, and an access mode edit (edit) may be designated as "https://sample.metaverse.jp/?area_id=A100&action=edit".

Furthermore, in order to edit non-area information (for example, a "home" area corresponding to a website of the WEB, or the like) possessed by a certain user U501, the access mode edit (editing) may be designated as the management site sample.metavers.jp, the user ID U501, and the access mode edit (edit), such as "https://sample.metaverse.jp/?user_id=U501&action=edit". According to each URL, different applications are activated as necessary, and after access management (user ID, password, and the like) for each content and input of an insufficient parameter and the like as necessary, the content can be directly accessed by an activated appropriate program (game program, metaverse program, WebGL, 3D editor) in a mode designated for the designated content.

(3) Synchronization Group Configuration Method

It is desirable that the terminal device configured to perform the synchronization operation exclusively perform the synchronization operation only between the groups in which the operation of the synchronization object is meaningful for sharing the virtual experience.

When the number of terminal devices configured to perform synchronization operation becomes enormous, processing and a communication amount for synchronization become enormous in the server device 1 and the terminal devices, and CPUs are highly loaded or a communication band reaches a limit. In the server device 1, even if the processing related to the replicas of the synchronization target object can be distributed and scaled by a method such as cloud to cope with an increase in the number, the communication band reaches the limit due to an increase in the communication amount in the terminal device. In particular, in the terminal device, sufficient performance cannot be expected in performance of the CPU and communication speed. In particular, in use in a wireless environment such as mobile, the communication speed may be unstable, and an increase in the communication amount may be unwelcome in a terminal subscribing to a metered communication fee.

In order to provide the sharing experience in the virtual space, it is ideal if all the objects in the virtual space can be shared by all the participants participating in the virtual space in the entire virtual space, but if the number of participants increases, it is economically difficult or technically impossible to realize the sharing experience. In addition, it is impossible or meaningless for the user to actually grasp the behavior of all the participants. In order to solve this problem, for example, it is necessary to reduce the number of objects to be subjected to the synchronization operation and to reduce the range (the number of users) in which an object is subjected to the synchronization operation. An example of the former is as described in the configuration of the synchronization target object (for example, objects exhibiting similar behavior are collected, and a single special synchronization target object for which only parameters (fields and the like) requiring synchronization processing are extracted among the objects is exclusively configured).

In order to reduce a range (the number of users) in which an object is subjected to the synchronization operation, the number of terminals configured to perform the synchronization operation is limited to a necessary minimum for each object. In many cases, the user terminal expresses only a small part of the objects constituting the virtual space without expressing all the objects. Therefore, if the synchronization operation is realized for only a small part of the objects being expressed, the experience in the virtual space that can be perceived by the user of the terminal device is the same for the other objects regardless of whether the synchronization operation is performed internally.

A terminal group to be subjected to the synchronization operation is defined for each object, and the synchronization operation may be performed only in the group. Furthermore, a subgroup can be further created in the synchronization group according to the transmission destination rule of the replica management information 114. In a typical virtual space or MMOG, each virtual space is divided into a plurality of areas (areas in which virtual space content can be experienced), and a terminal device of a user participates in a room in which the virtual space corresponding to the area is experienced. A terminal device participating in the same room virtually experiences, as an avatar, content provided by the area together with an avatar of another terminal device according to content of the area (a building, an attraction, or the like). In this environment, the avatar created by the participant and the appendage of the avatar are objects to be synchronized owned by the participant who is the creator, have a primary in the own terminal device, and perform synchronization processing with the terminal device of another participant participating in the room, so that it is possible to notify another participant of the own activity status. Note that, here, as the synchronization target objects, the avatars and the appendages of the avatars are listed as the synchronization target objects for the sake of simplicity. However, in an actual implementation, it is efficient to aggregate the information as the minimum number of parameters such as positions and postures among the information (non-area information) of a plurality of objects managed by the user including the avatars and the appendages of the avatars, collectively implement the avatars and the appendages of the avatars for each user as a special object (synchronization target non-area information) for single user information management, and perform synchronization processing.

In order to share the activity situation of other participants in a specific region (room) of the virtual space, each participant has ownership of the own synchronization target non-area, and the terminal device of each participant holds the primary for the own synchronization target non-area and the tertiary for the synchronization target user management information of other participants.

Similarly, it is also possible to share a change in state (area information) for content (area) of a specific region in the virtual space. In a case where a plurality of rooms coexist corresponding to an area, when a participant of one room changes area information, the change can be reflected not only to other participants of the same room but also to area information of other rooms (parallel world) in the same area even in different rooms. In order to share the change among the plurality of rooms, the terminal group configured to perform synchronization operation may be set as the participant terminal for all the rooms in the area.

For example, it is assumed that the area creator also participates in one of the rooms in the area. The area creator is the owner of the area information of the area. Also for the synchronization of the area information of the area, the individual terrain objects are not directly synchronized, but only the area information to be synchronized which is a part of the fields of the plurality of terrain objects to be synchronized is collected as a special single object. In a case where the area creator terminal participates in one of the rooms of the area, the area creator terminal holds the primary of the synchronization target area information of the area in addition to the primary of the own synchronization target non-area information and the tertiary of the synchronization target non-area information of other participants of the same room participant. In this case, the creator terminal of the area is the creator of the area, is the owner of the area, and is further the owner (primary holder) of the synchronization target object related to the area in the synchronization operation. A participant terminal of a room in an area other than an area participant holds a tertiary of synchronization target area information of the area in addition to a primary of the own synchronization target non-area information and a tertiary of synchronization target non-area information of other participants of the same room participant, regardless of whether the participant participates in the same room of the area participant or participates in another room.

Depending on the type of virtual space, in some cases, it is not realistic to assume that the area creator always participates. Here, it is assumed that the area creator is the owner and the editor. However, for example, considering a virtual space for promotion of a company, the area creator may be a content creator outsourced by a company, the owner may be the president of the company, and the editor may be the president or an employee in the public relations department of the company. Here, a case where the area creator is also an area editor will be described. However, as in the example of the virtual space for promotion of the company, it may be appropriate to read the area creator as the area editor in the following description as necessary.

Even in a case where the area creator (editor) does not participate, for the synchronization processing, the owner of the synchronization target object is always required for the area information of the synchronization target. In order to perform the synchronization processing on the area information of the synchronization target, any terminal device belonging to the synchronization group of the area information of the synchronization target always becomes the owner of the synchronization target object. The owner of the synchronization target object may be determined in any manner. For example, the terminal device may be a terminal device participating in the synchronization group from the earliest or a terminal device that has the smallest terminal ID. In addition, in order to reduce the number of synchronization target objects, a method of synchronizing a single or a small number of pieces of synchronization target area information including only parameters to be synchronized among all the objects constituting the area information has been described. However, in a case of the area information for which a participant who actively operates a synchronization target object is not determined and the owner of a synchronization target object is arbitrary, a plurality of synchronization target area information objects may be generated on purpose for load distribution in the server device, and each of the plurality of synchronization target area information objects may be owned by another terminal device. However, it is necessary to carefully distribute the owners, and if the owners of the synchronization target objects that has a dependency relationship with each other are different terminal devices, control may become complicated or a load may increase instead.

FIG. 16 illustrates a state in which a non-area in formation to be synchronized and area information to be synchronized are synchronized in each target terminal as a primary, a replica, and a tertiary when there are a plurality of rooms 101 and 102 in the area 100. The users A, B, and C participate in the room 101 in the area 100 with the terminal devices A, B, and C, respectively. Similarly, the users X and Y participate in the room 102 in the area 100 with the terminal devices X and Y, respectively. Non-areas (A0, B0, C0) which are synchronization targets of the users A, B, and C are synchronized (A2, B2, C2) by the user terminal devices A, B, and C which are participants of the room 101 via a replica (A1, B1, C1) in the server device 1, non-areas (X0, Y0) which are synchronization targets of the users X and Y are synchronized (X2, Y2) by the user terminal devices X and Y which are participants of the room 102 via a replica (X1, Y1) in the server device 1, and area information (G0) which is a synchronization target of the area 100 is synchronized (G2) by the user terminal devices A, B, C, X, and Y which are participants of the rooms 100 and 101 which are rooms of the area 100 via a replica (G1) information the server device.

As described above, regarding the case where there are a plurality of rooms in a single area, the embodiments have been described in which the area information and the non-area are synchronized by setting the terminal device groups configured to perform the synchronization operation as the area participating terminal and the room participating terminal. However, the synchronization group is not limited to an area and a room. Furthermore, the relationship of the synchronization group is not limited to a relationship in which one is included in the other, such as an area and a room. The synchronization group may be freely created. The synchronization groups may be completely matched, included as part, only partially common, or completely independent without a common part. Each synchronization group manages the participant terminal by the method illustrated in FIG. 4 or 5. Although the example in which the room is dynamically generated and deleted has been described above, the synchronization group is not necessarily a synchronization group in which the terminal device is fixed and unchanged. Although it also depends on the content of the experience of the virtual space to be provided, in each synchronization group, the participants change with time, the synchronization group may be dynamically created and deleted, or the terminal may participate in or exit the synchronization group in the middle. For example, as the synchronization group, in addition to an area and a room, a chat group, a cooperation party, an affiliation organization, and the like can be considered. A chat group, a cooperating party, or an affiliation organization exists beyond boundaries of a room or an area, and synchronously shares a text, a voice message, an activity status (online, visiting outer space X, visiting cat world Y, battling monster X, visiting M company showroom, negotiating with N company, etc.), or the like in each unit in a manner superimposed on sharing of a synchronous experience in the room or the area. For example, a voice chat may be superimposed on a speaker to be heard, and a button or a switch on a screen may be switched to switch between an utterance to a room and an utterance to a chat group. In addition, for the activity status, a status list of the belonging organization members may be superimposed on the display screen of the virtual world being engaged in by clicking a team status icon arranged in the upper right of the screen.

Furthermore, in order to achieve the above-described object, another aspect of the embodiments provides the following information processing device, data synchronization program, data synchronization method, data synchronization system, and terminal device.

[1] An information processing device that is connected through a network to a plurality of clients configured to synchronize an object with each other, the information processing device including:

reception means configured to receive change content information of a synchronization target object from a client that has ownership of the synchronization target object;

update means configured to update a replicated object obtained by replicating the synchronization target object by using the change content information; and transmission means configured to transmit the change content information to a client other than the client that has the ownership among the plurality of clients.

[2] The information processing device according to [1], in which when a client participates, the reception means receives the synchronization target object owned by the client and stores the synchronization target object as the replicated object in a recording medium.

[3] The information processing device according to [1], in which when the client generates a new object, the reception means replicates the newly generated object as the synchronization target object and stores the replicated object in a recording medium.

[4] The information processing device according to [2] or [3], in which when the client participates or when the client newly generates an object, the transmission means transmits the replicated object or the synchronization target object stored in a recording medium to a client other than the client that has the ownership among the plurality of clients.

[5] The information processing device according to any of [1] to [4], in which the reception means does not receive the change content information of the synchronization target object from a client other than the client that has the ownership of the synchronization target object.

[6] The information processing device according to any of [1] to [4], in which in a case where the reception means receives the change content information of the synchronization target object from a client other than the client that has the ownership of the synchronization target object, the update means does not update the replicated object.

[7] The information processing device according to any of [1] to [4], in which in a case where the reception means receives the change content information of the synchronization target object from a client other than the client that has the ownership of the synchronization target object, the transmission means does not transmit the change content information to the client that has the ownership.

[8] The information processing device according to any of [1] to [7], in which the reception means receives a difference from the synchronization target object before change as the change content information of the synchronization target object, and the update means updates the replicated object.

[9] The information processing device according to any of [1] to [8], further functioning as management means configured to transfer ownership of the replicated object corresponding to the synchronization target object owned by the client to a different client other than the client based on a predetermined rule in a case where the transfer of the ownership is permitted when the client exits.

[10] The information processing device according to any of [1] to [8], further functioning as management means configured to delete the replicated object in a case where transfer of ownership of the replicated object corresponding to the synchronization target object owned by the client is not permitted when the client exits, in which the transmission means instructs a different client other than the client to delete an object corresponding to the replicated object held by the different client.

[11] A data synchronization program for a computer connected through a network to a plurality of clients configured to synchronize an object with each other, the data synchronization program being configured to cause the computer to function as:

reception means configured to receive change content information of a synchronization target object from a client that has ownership of the synchronization target object;

update means configured to update a replicated object obtained by replicating the synchronization target object by using the change content information; and transmission means configured to transmit the change content information to a client other than the client that has the ownership among the plurality of clients.

[12] A data synchronization method performed by an information processing device connected through a network to a plurality of clients configured to synchronize an object with each other, the data synchronization method including:

receiving change content information of a synchronization target object from a client that has ownership of the synchronization target object;

updating a replicated object obtained by replicating the synchronization target object by using the change content information; and transmitting the change content information to a client other than the client that has the ownership among the plurality of clients.

[13] A data synchronization system including:

a plurality of clients configured to synchronize an object with each other; and an information processing device that is connected through a network to the plurality of clients and includes:

reception means configured to receive change content information of a synchronization target object from a client that has ownership of the synchronization target object;

update means configured to update a replicated object obtained by replicating the synchronization target object by using the change content information; and transmission means configured to transmit the change content information to a client other than the client that has the ownership among the plurality of clients.

[14] The data synchronization system according to [13], in which in a case where the replicated object of the synchronization target object owned by the client itself is received from the information processing device, the plurality of clients refuse to receive the replicated object.

[15] The data synchronization system according to [13] or [14], in which the plurality of clients transmit, to the information processing device, a difference from the synchronization target object before change as the change content information of the synchronization target object.

[16] A terminal device serving as a client configured to synchronize an object with another client and including:

reception means configured to receive change content information of a synchronization target object from a client that has ownership of the synchronization target object;

update means configured to update a replicated object obtained by replicating the synchronization target object by using the change content information; and transmission means configured to transmit the change content information to a client other than the client that has the ownership among the plurality of clients, in which the terminal device is communicably connected to the information processing device.

[17] The terminal device serving as a client according to [16], in which in a case where the replicated object of the synchronization target object owned by the client itself is received from the information processing device, the terminal device refuses to receive the replicated object.

[18] The terminal device serving as a client according to or [17], in which a difference from the synchronization target object before change is transmitted to the information processing device as the change content information of the synchronization target object.

[19] An information processing device connected through a network to a plurality of clients configured to synchronize an object with each other, the information processing device including:

reception means configured to receive change content information of a synchronization target object from the plurality of clients;

update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and transmission means configured to transmit the change content information to a client other than the client that has the ownership among the plurality of clients.

[20] An information processing device connected through a network to a plurality of clients configured to synchronize an object with each other, the information processing device including:

reception means configured to receive change content information of a synchronization target object from the plurality of clients;

update means configured to update a replicated object obtained by replicating the synchronization target object by using the change content information; and transmission means configured to transmit, by referring to management information that is managed for each synchronization target object and defines a client that has ownership of the synchronization target object, the change content information to a client other than the client that has the ownership among the plurality of clients in a case where a transmission source client is defined as the client that has the ownership of the synchronization target object in the management information.

[21] The information processing device according to [19] or [20], in which when a client participates in a virtual space in which the plurality of clients participates, the reception means receives the synchronization target object owned by the client and stores the synchronization target object as the replicated object in a recording medium.

[22] The information processing device according to [19] or [20], in which when the client generates a new object, the reception means replicates the newly generated object as the synchronization target object and stores the replicated object in a recording medium.

[23] The information processing device according to [21] or [22], in which when the client participates or when the client newly generates an object, the transmission means transmits the replicated object or the synchronization target object stored in a recording medium to a client other than the client that has the ownership among the plurality of clients.

[24] The information processing device according to any of [19] to [23], in which the reception means does not receive the change content information of the synchronization target object from a client other than the client that has the ownership of the synchronization target object.

[25] The information processing device according to any of [19] to [23], in which in a case where the reception means receives the change content information of the synchronization target object from a client other than the client that has the ownership of the synchronization target object, the update means does not update the replicated object.

[26] The information processing device according to any of [19] to [23], in which in a case where the reception means receives the change content information of the synchronization target object from a client other than the client that has the ownership of the synchronization target object, the transmission means does not transmit the change content information to the client that has the ownership.

[27] The information processing device according to any of [19] to [26], in which the reception means receives a difference from the synchronization target object before change as the change content information of the synchronization target object, and the update means updates the replicated object.

[28] The information processing device according to any of [19] to [27], further functioning as management means configured to transfer ownership of the replicated object corresponding to the synchronization target object owned by the client to a different client other than the client based on a predetermined rule in a case where the transfer of the ownership is permitted when the client exits from a virtual space in which the plurality of clients participate.

[29] The information processing device according to any of [19] to [26], further functioning as
management means configured to delete the replicated object in a case where transfer of ownership of the replicated object corresponding to the synchronization target object owned by the client is not permitted when the client exits from the virtual space in which the client participates,
in which the transmission means instructs a different client other than the client to delete an object corresponding to the replicated object held by the different client.

[30] A data synchronization program for a computer connected through a network to a plurality of clients configured to synchronize an object with each other, the data synchronization program being configured to cause the computer to function as:
reception means configured to receive change content information of a synchronization target object from the plurality of clients;
update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and
transmission means configured to transmit the change content information to a client other than the client that has the ownership among the plurality of clients.

[31] A data synchronization program for a computer connected through a network to a plurality of clients configured to synchronize an object with each other, the data synchronization program being configured to cause the computer to function as:
reception means configured to receive change content information of a synchronization target object from the plurality of clients;
update means configured to update a replicated object obtained by replicating the synchronization target object by using the change content information; and
transmission means configured to transmit, by referring to management information that is managed for each synchronization target object and defines a client that has ownership of the synchronization target object, the change content information to a client other than the client that has the ownership among the plurality of clients in a case where a transmission source client is defined as the client that has the ownership of the synchronization target object in the management information.

[32] A data synchronization method performed by an information processing device connected through a network to a plurality of clients configured to synchronize an object with each other, the data synchronization method including:
receiving change content information of a synchronization target object from the plurality of clients;
updating, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and
transmitting the change content information to a client other than the client that has the ownership among the plurality of clients.

[33] A data synchronization method performed by an information processing device connected through a network to a plurality of clients configured to synchronize an object with each other, the data synchronization method including:
receiving change content information of a synchronization target object from the plurality of clients;
updating a replicated object obtained by replicating the synchronization target object by using the change content information; and
transmitting, by referring to management information that is managed for each synchronization target object and defines a client that has ownership of the synchronization target object, the change content information to a client other than the client that has the ownership among the plurality of clients in a case where a transmission source client is defined as the client that has the ownership of the synchronization target object in the management information.

[34] A data synchronization system including:
a plurality of clients configured to synchronize an object with each other; and
an information processing device that is connected through a network to the plurality of clients and includes:
reception means configured to receive change content information of a synchronization target object from the plurality of clients;
update means configured to update, by referring to management information that is managed for each synchronization target object and defines a client that has ownership of the synchronization target object, a replicated object obtained by replicating the synchronization target object by using the change content information in a case where a transmission source client is defined as the client that has the ownership of the synchronization target object in the management information; and
transmission means configured to transmit the change content information to a client other than the client that has the ownership among the plurality of clients.

[35] A data synchronization system including:
a plurality of clients configured to synchronize an object with each other; and
an information processing device that is connected through a network to the plurality of clients and includes:
reception means configured to receive change content information of a synchronization target object from the plurality of clients;
update means configured to update a replicated object obtained by replicating the synchronization target object by using the change content information; and
transmission means configured to transmit, by referring to management information that is managed for each synchronization target object and defines a client that has ownership of the synchronization target object, the change content information to a client other than the client that has the ownership among the plurality of clients in a case where a transmission source client is defined as the client that has the ownership of the synchronization target object in the management information.

[36] The data synchronization system according to [34] or [35], in which the plurality of clients transmit, to the information processing device, a difference from the synchronization target object before change as the change content information of the synchronization target object.

[37] A terminal device serving as a client configured to synchronize an object with another client via an information processing device and communicably connected to the information processing device including:
reception means configured to receive, by referring to management information that is managed for each synchronization target object and defines a client that has ownership of the synchronization target object, change content information of a synchronization target object from the client that has the ownership of the synchronization target object via the information processing device in a case where a transmission source client is defined as the client that has the ownership of the synchronization target object in the management information;
update means configured to update a replicated object obtained by replicating the synchronization target object by using the change content information; and
transmission means configured to transmit the change content information to a client other than the client that has the ownership among the plurality of clients.

[38] A terminal device serving as a client configured to synchronize an object with another client via an information processing device and communicably connected to the information processing device including
transmission means configured to transmit, by referring to management information that is managed for each synchronization target object and defines a client that has ownership of the synchronization target object, the change content information to the information processing device in a case where the own client is defined as the client that has the ownership of the synchronization target object in the management information, when the replicated object obtained by replicating the synchronization target object is updated in the own client.

[39] The terminal device serving as a client according to [37] or [38], in which a difference from the synchronization target object before change is transmitted to the information processing device as the change content information of the synchronization target object.

INDUSTRIAL APPLICABILITY

Provided are an information processing device, a data synchronization program, a data synchronization method, a data synchronization system, and a terminal device that suppress an increase in processing load and communication load in a situation in which a plurality of user terminals participate and data of the plurality of user terminals are synchronized.

The invention claimed is:

1. An information processing device that is connected through a network to a plurality of clients configured to participate in one or more virtual spaces, and is capable of synchronizing a synchronization target object in the one or more virtual spaces among at least two or more clients of the plurality of clients in a synchronization group, wherein the synchronization target object includes terrain information for reproducing contents constituting the one or more virtual spaces, the information processing device comprising:
a non-transitory computer-readable medium containing executable instructions which when executed by one or more processors of a computer, causes the computer to:
receive change content information of the synchronization target object in the one or more virtual spaces from one of the plurality of clients in the synchronization group;
update a replicated synchronization target object obtained by replicating the synchronization target object by using the change content information;
transmit the change content information to one or more clients of the plurality of clients in a synchronization group in the synchronization group; and
edit the terrain information on a basis of operation content from any of the plurality of clients that has an edit right of the terrain information.

2. The information processing device according to claim 1, the non-transitory computer-readable medium containing executable instructions which when executed by one or more processors of a computer, further causes the computer to issue an identifier corresponding to an object including the synchronization target object in the one or more virtual spaces, thereby manage the terrain information.

3. The information processing device according to claim 2, wherein the identifier is used by the any of the plurality of clients to access content of the one or more virtual spaces.

4. The information processing device according to claim 3, wherein the access to the content of the one or more virtual spaces is configured to trigger participation of the any of the plurality of clients.

5. The information processing device according to claim 3, wherein the access to the content of the one or more virtual spaces is configured to trigger editing of the content by the any of the plurality of clients in the one or more virtual spaces.

6. The information processing device according to claim 3, wherein the access to the content of the one or more virtual spaces starts up a program in the any of the plurality of clients for participating in the one or more virtual spaces.

7. The information processing device according to claim 3, wherein the access to the content of the one or more virtual spaces is configured to trigger access to a web site for editing the content by the any of the plurality of clients, and starts up a web browser for accessing the web site.

8. The information processing device according to claim 1, wherein the one or more clients of the plurality of clients are capable of belonging to one or more of the synchronization groups.

9. The information processing device according to claim 1, wherein the synchronization group includes the at least two or more clients of the plurality of clients configured to synchronize user information among the synchronization target objects with each other.

10. The information processing device according to claim 9, wherein a client that has ownership of a synchronization target object corresponding to the terrain information among the synchronization target objects is a dummy client on a server.

11. A non-transitory computer-readable medium containing executable instructions which when executed by one or more processors of a computer connected through a network to a plurality of clients configured to participate in one or more virtual spaces and synchronize a synchronization target object in the one or more virtual spaces, wherein the synchronization target object includes terrain information for reproducing contents constituting the one or more virtual spaces, and in the one or more virtual spaces being synchronized among the plurality of clients in a synchronization group, causes the computer to perform operation comprising:

receiving change content information of the synchronization target object from one of the plurality of clients in the synchronization group;

updating, a replicated synchronization target object obtained by replicating the synchronization target object by using the change content information;

transmitting the change content information to one or more clients among the plurality of clients in the synchronization group; and editing the terrain information on a basis of operation content from any of the plurality of clients that has an edit right of the terrain information.

12. A data synchronization system comprising:
a plurality of clients configured to participate in one or more virtual spaces; and an information processing device connected through a network to the plurality of clients, a synchronization target object in the one or more virtual spaces being synchronized among the plurality of clients in a synchronization group, wherein the synchronization target object includes terrain information for reproducing contents constituting the one or more virtual spaces, the information processing device comprising:
a non-transitory computer-readable medium containing executable instructions which when executed by one or more processors of a computer, causes the computer to:
receive change content information of the synchronization target object from one of the plurality of clients in the synchronization group;

update a replicated synchronization target object obtained by replicating the synchronization target object;

transmit the change content information to one or more clients among the plurality of clients in the synchronization group; and editing the terrain information on a basis of operation content from any of the plurality of clients that has an edit right of the terrain information.

13. The data synchronization system according to claim 12, wherein the plurality of clients transmit, to the information processing device, a difference from the synchronization target object before change as the change content information of the synchronization target object.

14. A terminal device serving as a client configured to participate in one or more virtual spaces and communicably connected through a network to one or more clients via an information processing device, a synchronization target object in the one or more virtual spaces being synchronized among a plurality of clients in a synchronization group, wherein the synchronization target object includes terrain information for reproducing contents constituting the one or more virtual spaces, the terminal device comprising:

a non-transitory computer-readable medium containing executable instructions which when executed by one or more processors of a computer, causes the computer to:
receive change content information of the synchronization target object via the information processing device;

update a replicated synchronization target object obtained by replicating the synchronization target object by using the change content information; and access to the one or more virtual spaces and an editing web site of terrain information for reproducing content constituting the one or more virtual spaces, by using an identifier issued by the information processing device.

15. A terminal device serving as a client configured to participate in one or more virtual spaces and communicably connected through a network to one or more clients via an information processing device, a synchronization target object in the one or more virtual spaces being synchronized among a plurality of clients in a synchronization group, the synchronization target object includes terrain information for reproducing contents constituting the one or more virtual spaces, and the terminal device comprising:

a non-transitory computer-readable medium containing executable instructions which when executed by one or more processors of a computer, causes the computer to:
transmit the change content information to the information processing device, in case the synchronization target object is updated in an own client, wherein access to the one or more virtual spaces and an editing web site of terrain information for reproducing content constituting the one or more virtual spaces, by using an identifier issued by the information processing device.

16. The terminal device according to claim 14, wherein the change content information of the synchronization target object is a difference from the synchronization target object before change.

17. The terminal device according to claim 15, wherein the change content information of the synchronization target object is a difference from the synchronization target object before change.

18. A virtual space management provider that is connected through a network to a plurality of clients configured to participate in one or more virtual spaces, a synchronization target object in the one or more virtual spaces being synchronized among a plurality of clients in a synchronization group, wherein the synchronization target object includes terrain information for reproducing contents constituting the one or more virtual spaces, the virtual space management provider comprising:
- a non-transitory computer-readable medium containing executable instructions which when executed by one or more processors of a computer, causes the computer to:
- receive change content information of the synchronization target object from one of the plurality of clients in the synchronization group;
- update a replicated synchronization target object obtained by replicating the synchronization target object by using the change content information;
- transmit the change content information to one or more clients among the plurality of clients in the synchronization group; and
- edit the terrain information on a basis of operation content from any of the plurality of clients that has an edit right of the terrain information.

* * * * *